(12) United States Patent      (10) Patent No.: US 9,330,004 B2
Long      (45) Date of Patent: May 3, 2016

(54) DATA PROCESSING METHOD, CACHE NODE, COLLABORATION CONTROLLER, AND SYSTEM

(71) Applicant: HUAWEI TECHNOLOGIES CO., LTD., Shenzhen (CN)

(72) Inventor: Youshui Long, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 114 days.

(21) Appl. No.: 14/094,148

(22) Filed: Dec. 2, 2013

(65) Prior Publication Data

US 2014/0089594 A1     Mar. 27, 2014

Related U.S. Application Data

(63) Continuation of application No. PCT/CN2011/075063, filed on May 31, 2011.

(51) Int. Cl.
    *G06F 12/08*      (2006.01)
    *G06F 12/12*      (2006.01)
    *H04L 29/08*      (2006.01)

(52) U.S. Cl.
    CPC ............ *G06F 12/0824* (2013.01); *G06F 12/12* (2013.01); *H04L 29/08729* (2013.01); *H04L 67/2852* (2013.01)

(58) Field of Classification Search
None
See application file for complete search history.

(56) References Cited

U.S. PATENT DOCUMENTS

| | | | |
|---|---|---|---|
| 4,876,662 A | * | 10/1989 | Pence .............................. 365/78 |
| 2002/0143989 A1 | * | 10/2002 | Huitema et al. ............... 709/243 |
| 2003/0028819 A1 | * | 2/2003 | Chiu et al. ......................... 714/5 |
| 2008/0056135 A1 | * | 3/2008 | Lee et al. ...................... 370/236 |
| 2009/0034532 A1 | * | 2/2009 | Hsu et al. ................... 370/395.1 |
| 2009/0316715 A1 | | 12/2009 | Saniee |
| 2012/0158882 A1 | * | 6/2012 | Oehme et al. ................. 709/213 |

FOREIGN PATENT DOCUMENTS

| | | |
|---|---|---|
| CN | 101453480 A | 6/2009 |
| CN | 101959054 A | 1/2011 |

(Continued)

OTHER PUBLICATIONS

Ni et al., "Large-Scale Cooperative Caching and Application-Level Multicast in Multimedia Content Delivery Networks" IEEE Communications Magazine, May 2005, 8 pages.
Anderson et al., "New Algorithms for File System Cooperative Caching" 18th IEEE Symposium on Modeling, Analysis and Simulation of Computer and Telecommunication Systems, Miami, Florida, Aug. 17-19, 2010, 20 pages.

(Continued)

*Primary Examiner* — Jared Rutz
*Assistant Examiner* — Christopher Do
(74) *Attorney, Agent, or Firm* — Brinks Gilson & Lione

(57) ABSTRACT

The present invention provides a data processing method based on a cache node group for data caching, where each cache node in the group includes a local replacement-allowable data storage space for storing data accessed by a local client and a collaborative replacement-allowable data storage space for storing data content accessed by a non-local client. By using the data processing method to process data content stored in the local replacement-allowable data storage space and the collaborative replacement-allowable data storage space of the cache node, the clients can obtain data more accurately and directly during access to the cache node, thereby meeting different requirements for local optimization of the cache node.

30 Claims, 24 Drawing Sheets

(56) References Cited

FOREIGN PATENT DOCUMENTS

| CN | 102025634 A | 4/2011 |
|---|---|---|
| CN | 102067617 A | 5/2011 |
| WO | WO 03/075162 A1 | 9/2003 |

OTHER PUBLICATIONS

Masters Dissertation, "Research of Dynamic Replication Access-load-balancing Strategy on Heterogeneity Structured P2P Network" East China Normal University, Oct. 2009, 17 pages.

\* cited by examiner

DATA PROCESSING METHOD, CACHE NODE, COLLABORATION CONTROLLER, AND SYSTEM

CROSS-REFERENCE TO RELATED APPLICATIONS

This application is a continuation Application of International Application No. PCT/CN2011/075063, filed on May 31, 2011, both of which are hereby incorporated by reference in their entireties.

FIELD OF THE INVENTION

The embodiments of the present invention relates to the field of network communications, and in particular, to a data processing method, a cache node, a collaboration controller, and a system.

BACKGROUND OF THE INVENTION

With the popularization of broadband access and the rapid development of streaming media-based broadband applications, Content Delivery network (CDN) is found an effective means of effectively mitigating the pressure exerted on a backbone network by high throughput of streaming media transmission and improving the quality of service of the streaming media. Therefore, in recent years, the CDN has attracted more and more attention and have been deployed widely at home and abroad, and streaming media content has also replaced Web content as the main object borne by the CDN.

The core idea of the CDN is to replicate data content from the center network to an edge close to users. In this manner, the performance for the users to access content is effectively improved, and the pressure on center equipment and the bone network is effectively reduced, and through the CDN, content is changed from the original centralized structure to a distributed structure.

A single CDN server is equivalent to a cache node and can only provide limited cache and service capabilities. Therefore, it is required to establish a cache node group which is formed by multiple CDN servers and performs collaborative works in collaborative caching mode, where cache space of the CDNs are fully used to improve the hit ratio, disperse hotspot data, and balance loads of the servers, thereby preventing failure of a single point, and solving the bottleneck problem.

The single internal storage space of a CDN cache node according to the prior art is used for storing both local data content for local access and collaborative data content for non-local access. Meanwhile, in the collaboration, because only the global collaboration objective is taken into consideration, the CDN cache nodes participating in the collaboration are completely equivalent, but no attention is placed on different demands for the local optimization of caching.

SUMMARY OF THE INVENTION

To solve the foregoing technical problems, embodiments of the present invention provide a data processing method, a cache node, a collaboration controller, and a system, which effectively manages data participating in collaboration, in comprehensive consideration of the global collaboration and single cache nodes.

The technical solutions are as follows.

A data processing method based on a cache node group for data caching, where each cache node in the group includes a local replacement-allowable data storage space for storing data accessed by a local client and a collaborative replacement-allowable data storage space for storing data content accessed by a non-local client;

the method including:

searching, by an accessed cache node receiving a data request from a client, for data content corresponding to the data request;

querying a preset data content directory list when the data content is not found in the local replacement-allowable data storage space of the accessed cache node, where a mapping relationship between data content and corresponding cache nodes that store the data content is set in the data content directory list;

according to the mapping relationship, determining a target cache node containing the data content among one or more other cache nodes in the cache node group; and obtaining the data content from the collaborative replacement-allowable data storage space of the target cache node, and storing the data content to the local replacement-allowable data storage space of the accessed cache node.

A cache node applied in a cache node group for data caching, including a control module, a local replacement-allowable data storage space, and a collaborative replacement-allowable data storage space;

where:

the local replacement-allowable data storage space is used for storing data accessed by a local client;

the collaborative replacement-allowable data storage space is used for storing data content accessed by a non-local client; and the control module is configured to receive a data request sent by a client, and search, in the local replacement-allowable data storage space, for data content corresponding to the data request; when the data content is not found in the local replacement-allowable data storage space, query a mapping relationship between data content and corresponding cache nodes that store the data content, where the mapping relationship is set in a data content directory list, and according to the mapping relationship, use a cache node containing the data content among one or more other cache nodes in the cache node group as a target cache node; and obtain the data content from a collaborative replacement-allowable data storage space of the target cache node, and store the data content to the local replacement-allowable data storage space.

A data processing method based on a cache node group for data caching, where each cache node in the group includes a local replacement-allowable data storage space for storing data accessed by a local client and a collaborative replacement-allowable data storage space for storing data content accessed by a non-local client;

the method including:

obtaining a link utilization ratio of a topological link on which each cache node in the cache node group is located; and adjusting, according to the link utilization ratio, a proportion of each cache node participating in collaboration in the cache node group.

A collaboration controller, including:

an obtaining module, configured to obtain a link utilization ratio of a topological link on which each cache node in a cache node group is located; and an adjustment module, configured to adjust, according to the link utilization ratio obtained by the obtaining module, a proportion of each cache node participating in collaboration in the cache node group.

A data processing system, including a cache node group formed by cache nodes, and a collaboration controller.

As can be seen from the technical solutions provided in the embodiments of the present invention, the data processing method and the cache node, the collaboration controller and the data processing system that implement the method provided in the present invention are based on a cache node group for data caching, where each cache node in the group includes a local replacement-allowable data storage space for storing data accessed by a local client and a collaborative replacement-allowable data storage space for storing data content accessed by a non-local client. The foregoing two storage spaces are used for storing data content to be accessed by local and non-local clients, which makes the internal storage space of the cache node segmented and specialized, so that the clients can obtain data more accurately and directly during access to the cache node, thereby meeting different requirements for local optimization of the cache node.

The cache nodes have the same structure, and when a client fails to find required data content by accessing a local cache node, the client can obtain the required data by accessing, through data collaboration, cache nodes of other clients, so that data obtaining of a single cache node is optimized while ensuring the global data caching of the cache node group.

Meanwhile, when the storage space of the cache node reaches a threshold, for example, the storage space is full, a replacement operation is performed on the content which is obtained by the cache node and is to be saved to the local replacement-allowable data storage space or the collaborative replacement-allowable data storage space, so as to replace data content that is least frequently accessed in the local replacement-allowable data storage space or the collaborative replacement-allowable data storage space with the obtained data content, thereby ensuring the smoothness and timeliness of obtaining the required data content by the client. In addition, to ensure the reusability of data content and save link resources, a process is further included in which replaced data content in a replacement-allowable data storage space of a cache node is added to another replacement-allowable data storage space when a certain condition is met, so that the space of each cache node is utilized to the greatest extent.

In the implementation of the foregoing method, when the link utilization ratio of a link where a cache node is located is too high and exceeds a preset threshold, some pieces of data content in the collaborative replacement-allowable data storage space of the cache node that participate in the collaboration and are frequently accessed are transferred, so as to reduce the link utilization ratio of the cache node to balance the overall link utilization ratio of the cache node group, thereby making the data collaboration process balanced and stable.

Based on the cache node and the data processing method, the embodiments of the present invention further provide a collaboration controller, configured to monitor and control the participation of each cache node of a cache node group in collaboration, collect statistics of data content participating in collaboration in each cache node and distribute a data content list to each cache node of the cache node group, and adjust the collaboration proportion of each cache node, thereby further optimizing the data caching process.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings show merely some embodiments of the present invention, and persons of ordinary skill in the art may still derive other drawings from these accompanying drawings without creative efforts.

Figure 1:
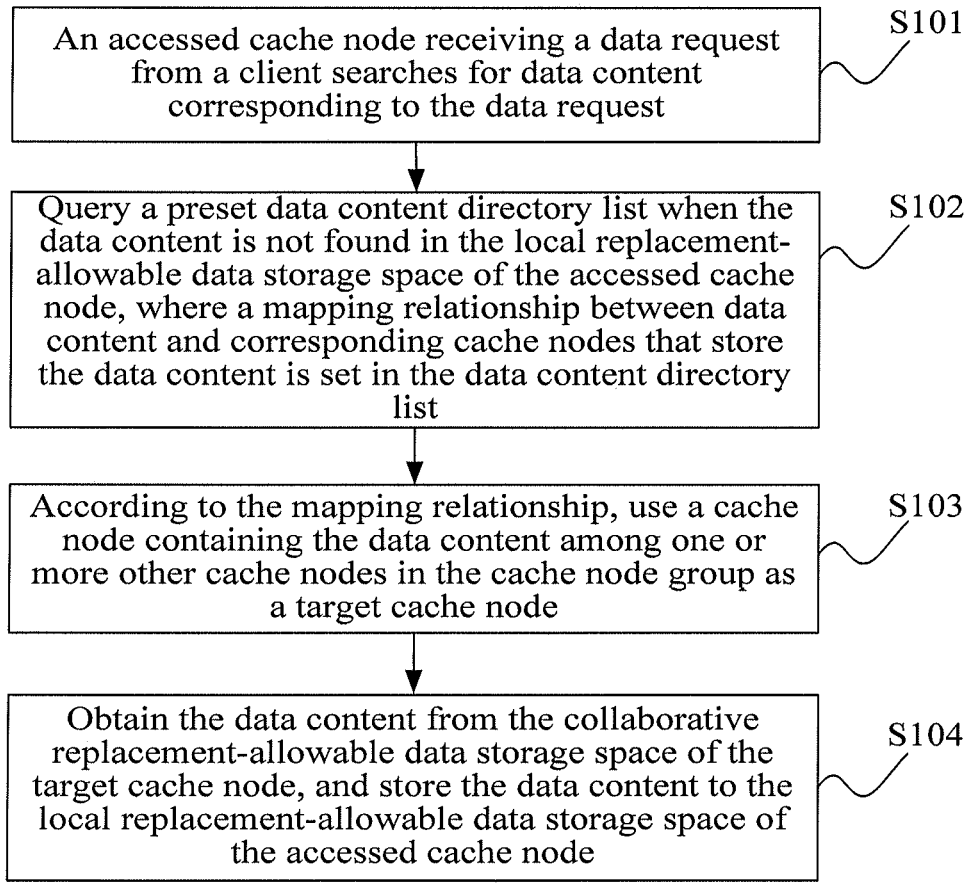
FIG. 1 is a method flowchart of a data processing method according to an embodiment of the present invention.

For simplicity and clarity of illustration, the accompanying drawings illustrate the general manner of construction, and descriptions and details of well-known features and techniques may be omitted to prevent unnecessarily obscuring the present invention. Additionally, units in the accompanying drawings are not necessarily drawn to scale. For example, the dimensions of some of the units in the figures may be exaggerated relative to other units to help improve understanding of the embodiments of the present invention. The same reference numerals in different figures denote the same units.

The terms "first," "second," "third," "fourth," and the like (if any) in the description and in the claims are used for distinguishing between similar units and not necessarily for describing a particular sequential or chronological order. It is to be understood that the terms so used are interchangeable under appropriate circumstances such that the embodiments of the present invention described herein are, for example, capable of operation in sequences other than those illustrated or otherwise described herein. Furthermore, the terms "include," and "have," and any variations thereof, are intended to cover a non-exclusive inclusion, such that a process, method, system, article, or device that includes a list of units is not necessarily limited to those units, but may include other units not expressly listed or inherent to such process, method, system, article, or device.

DETAILED DESCRIPTION OF THE EMBODIMENTS

To make the solutions of the present invention more comprehensible for a person skilled in the art, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

FIG. 1 shows a method flowchart of a data processing method according to an embodiment of the present invention. The method is based on a cache node group for data caching, where each cache node in the group includes a local replacement-allowable data storage space for storing data accessed by a local client and a collaborative replacement-allowable data storage space for storing data content accessed by a non-local client; and the data content in the collaborative replacement-allowable data storage space participates in the global collaboration in the cache node group.

The method includes the following steps:

Step S101: An accessed cache node receiving a data request from a client searches for data content corresponding to the data request.

Each cache node in the cache node group has a corresponding client, and the client sends a data request to its corresponding cache node in order to obtain required data content.

Step S102: Query a preset data content directory list when the data content is not found in the local replacement-allowable data storage space of the accessed cache node, where a mapping relationship between data content and corresponding cache nodes that store the data content is set in the data content directory list.

Data content accessed by the local client is stored in the local replacement-allowable data storage space of the cache node. After receiving the data request sent by the client, the accessed cache node searches, in its local replacement-allowable data storage space, for data content corresponding to the data request sent by the client. When the data content is not found in the local replacement-allowable data storage space of the accessed cache node, it indicates that the data content required by the local client is not stored in the local replacement-allowable data storage space of the accessed cache node. At this time, a data collaboration process in the cache node group is performed, and the preset data content directory list is queried, where a mapping relationship between data content and corresponding cache nodes that store the data content is set in the data content directory list.

Step S103: According to the mapping relationship, use a cache node containing the data content among one or more other cache nodes in the cache node group as a target cache node.

According to the mapping relationship set in the data content directory list, a physical position of the cache node where the data content corresponding to the data request sent by the local client is stored is queried, and a cache node obtained through query is used as the target cache node.

Step S104: Obtain the data content from the collaborative replacement-allowable data storage space of the target cache node, and store the data content to the local replacement-allowable data storage space of the accessed cache node.

The data content required by the client is obtained from the collaborative replacement-allowable data storage space of the determined target cache node, and the obtained data content is saved to the local replacement-allowable data storage space of the locally accessed cache node.

In the implementation of step S103 and step S104 in the method, when the following information is obtained through query according to the mapping relationship: the data content corresponding to the data request sent by the client is stored in the collaborative replacement-allowable data storage space of a locally accessed cache node, the locally accessed cache node is the target cache node, the data content corresponding to the data request stored in the collaborative replacement-allowable data storage space of the locally accessed cache node is directly sent to the local client, and the data content is added from the collaborative replacement-allowable data storage space to the local replacement-allowable data storage space. The process of determining the target cache node among the one or more other cache nodes of the cache node group in step S103 is performed when the data content corresponding to the data request sent by the client does not exist in the accessed cache node.

In the implementation of the foregoing data processing method, the queried data content directory list records data content participating in collaboration in each cache node of the cache node group and access frequencies of the data content in a time period. Any cache node of the data cache node group is preset therein in real time with a data content directory list, and the directory list may be preset in real time by a processing device. In the data processing method provided in the embodiment of the present invention, the data content directory list in each cache node is preferably preset by a collaboration controller, and the collaboration controller interacts with each cache node in real time in the implementation of the data processing method and updates the data content directory list in each cache node.

In the data processing method provided in the embodiment of the present invention, the data content directory list may exist in various forms. For example, as in the foregoing description, the collaboration controller presets the updated data content directory list in each cache node in real time; or, the collaboration controller presets the updated data content directory list in the collaboration controller, and when needing to query the data content directory list, each cache node sends a query request to the collaboration controller; or, the collaboration controller presets the data content directory list in a third-party device, and when needing to query the data content directory list, each cache node sends a query request to the third-party device.

Figure 2:
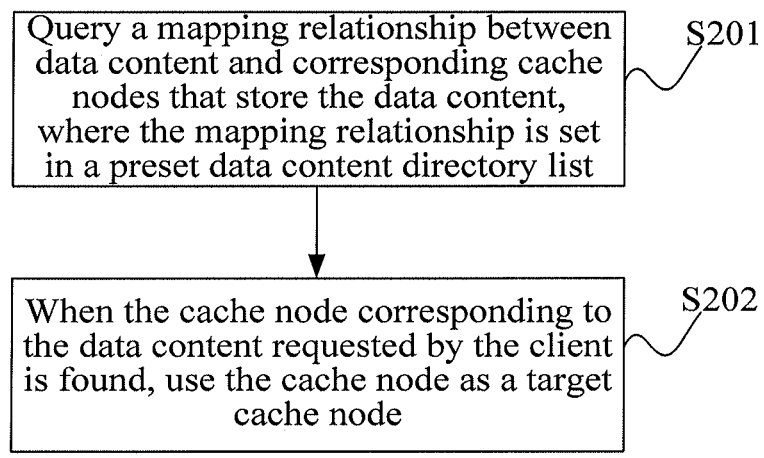
FIG. 2 is a flowchart of a method for determining a target cache node in a data processing method according to an embodiment of the present invention.

A process of determining another cache node where the data content is located through the preset data content directory list when the data content corresponding to the data request sent by the client is not found in the local replacement-allowable data storage space of the accessed cache node is shown in FIG. 2 provided in an embodiment of the present invention, and the process includes the following steps:

Step S201: Query a mapping relationship between data content and corresponding cache nodes that store the data content, where the mapping relationship is set in a preset data content directory list.

Step S202: When the cache node corresponding to the data content requested by the client is found, use the cache node as a target cache node.

Figure 3:
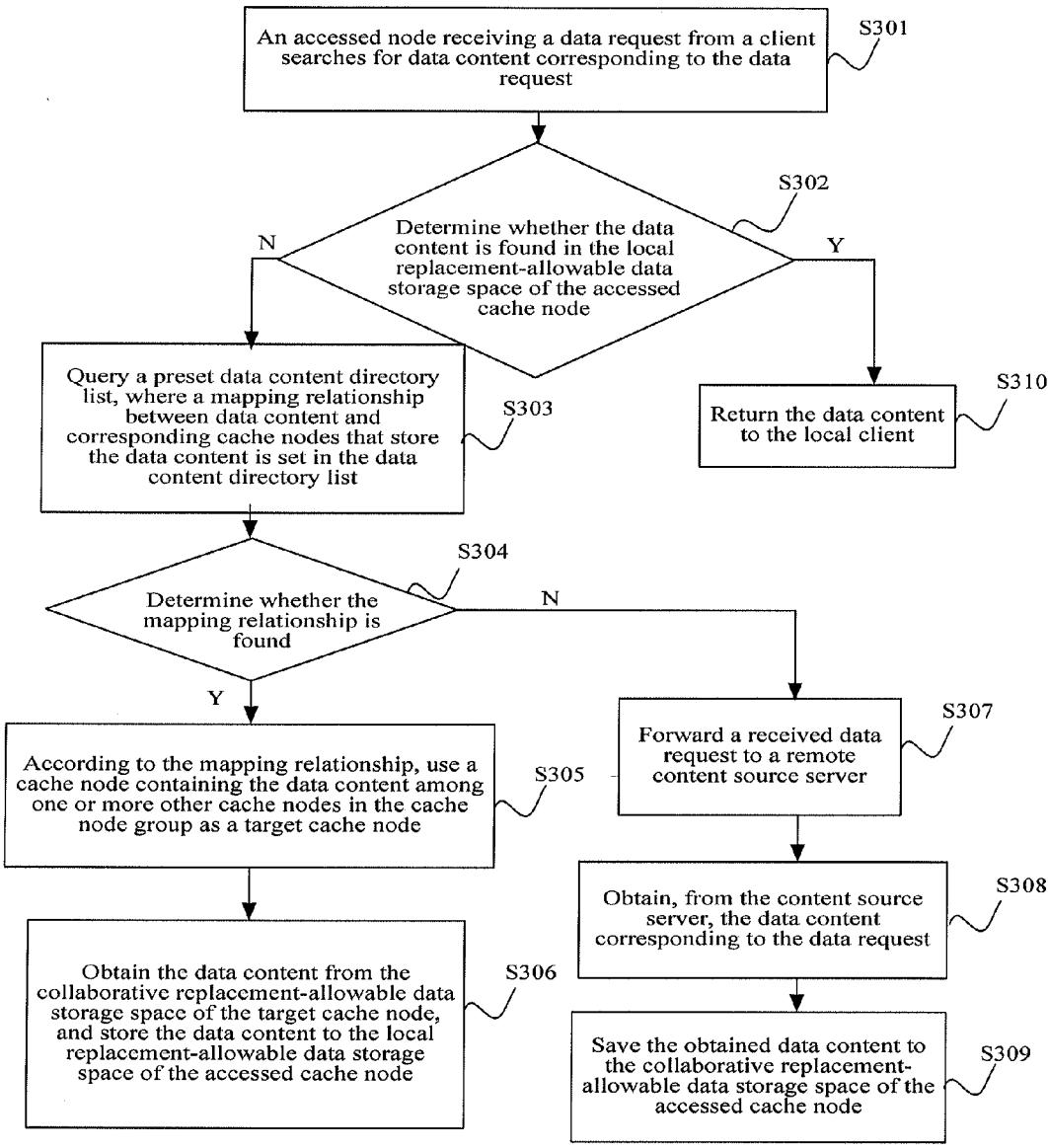
FIG. 3 is a detailed flowchart of a data processing method according to an embodiment of the present invention.

Based on the implementation shown in FIG. 2, FIG. 3 shows a detailed flowchart of a data processing method according to an embodiment of the present invention, which includes the following steps:

Step S301: An accessed node receiving a data request from a client searches for data content corresponding to the data request.

Step S302: Determine whether the data content is found in the local replacement-allowable data storage space of the accessed cache node. If the data content is not found, perform step S303; otherwise, perform step S310.

Step S303: Query a preset data content directory list, where a mapping relationship between data content and corresponding cache nodes that store the data content is set in the data content directory list.

Step S304: Determine whether the mapping relationship between data content and corresponding cache nodes that store the data content is found in the data content directory list. If yes, perform step S305; otherwise, perform step S307.

Step S305: According to the mapping relationship, use a cache node containing the data content among one or more other cache nodes in a cache node group as a target cache node.

Step S306: Obtain the data content from the collaborative replacement-allowable data storage space of the target cache node, and store the data content to the local replacement-allowable data storage space of the accessed cache node.

Step S307: Forward, to a remote content source server, the data request sent by the local client.

The content source server is a start position of each piece of content required by the client and contains all data content required by the client.

Step S308: Obtain, from the content source server, the data content corresponding to the data request.

Step S309: Save the obtained data content to the collaborative replacement-allowable data storage space of the accessed cache node.

Because the mapping relationship is not found in the data content directory list, that is, none of the collaborative replacement-allowable data storage spaces of all cache nodes in the cache node group has stored the data content corresponding to the data request sent by the local client, the data content obtained from the content source server is added to the collaborative replacement-allowable data storage space of the accessed cache node to participate in the global data collaboration, so that one or more other cache nodes are capable of obtaining the data content in time when requiring the data content.

Step S310: Return the found data content to the local client.

Figure 4:
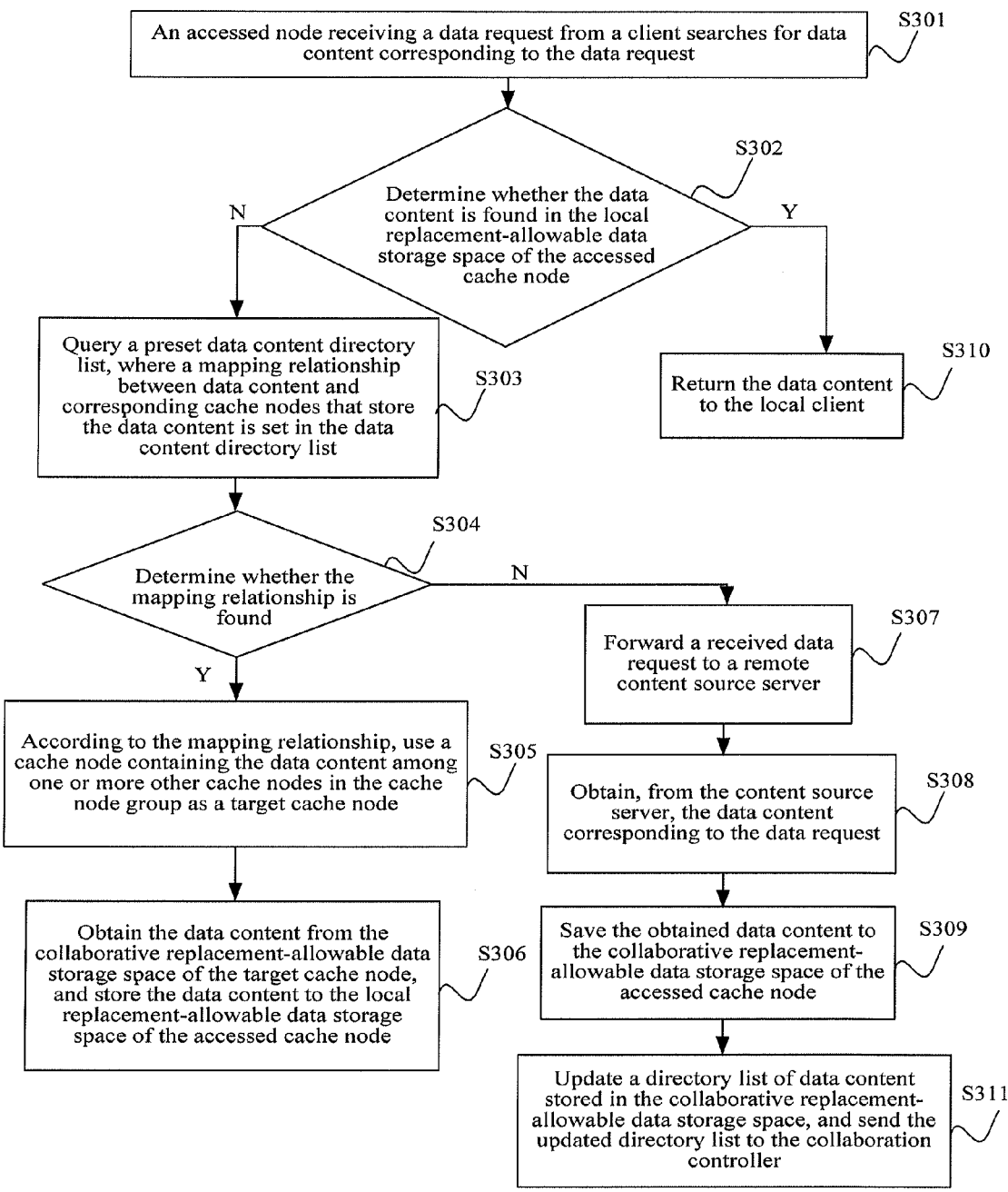
FIG. 4 is another detailed flowchart of a data processing method according to an embodiment of the present invention.

For the data processing method shown in FIG. 3, after the data content obtained from the content source server is added to the collaborative replacement-allowable data storage space of the accessed cache node, a process of updating the data content directory list is also included. As shown in FIG. 4 provided in an embodiment of the present invention, the process includes the following steps:

Step S311: Update a directory list of data content stored in the collaborative replacement-allowable data storage space, and send the updated directory list to the collaboration controller.

When the obtained data content is added to the collaborative replacement-allowable data storage space of the accessed cache node, there is new data content participating in the global data collaboration in the collaborative replacement-allowable data storage space of the accessed cache node. Therefore, the data content directory list needs to be updated, and at this time, the data content directory list is the data content directory list of the collaborative replacement-allowable data storage space. Because the collaboration controller manages and controls data content participating in collaboration in the collaborative replacement-allowable data storage space in each cache node of the cache node group, the collaboration controller provided in the embodiment of the present invention mainly updates the data content directory list in the collaborative replacement-allowable data storage space of each cache node.

It should be particularly emphasized that, in the implementation of the data processing method provided in the embodiment of the present invention, when data content in the collaborative replacement-allowable data storage space of any cache node in the cache node group is changed, no matter new content is added or existing content is deleted, the cache node updates the data content directory list in the collaborative replacement-allowable data storage space, and sends the updated data content directory list to the collaboration controller, and the collaboration controller updates the data content directory lists in the collaborative replacement-allowable data storage spaces of all the cache nodes in the data cache node group. The update is not limited by the steps in the data processing method provided in the embodiment of the present invention.

Figure 5:
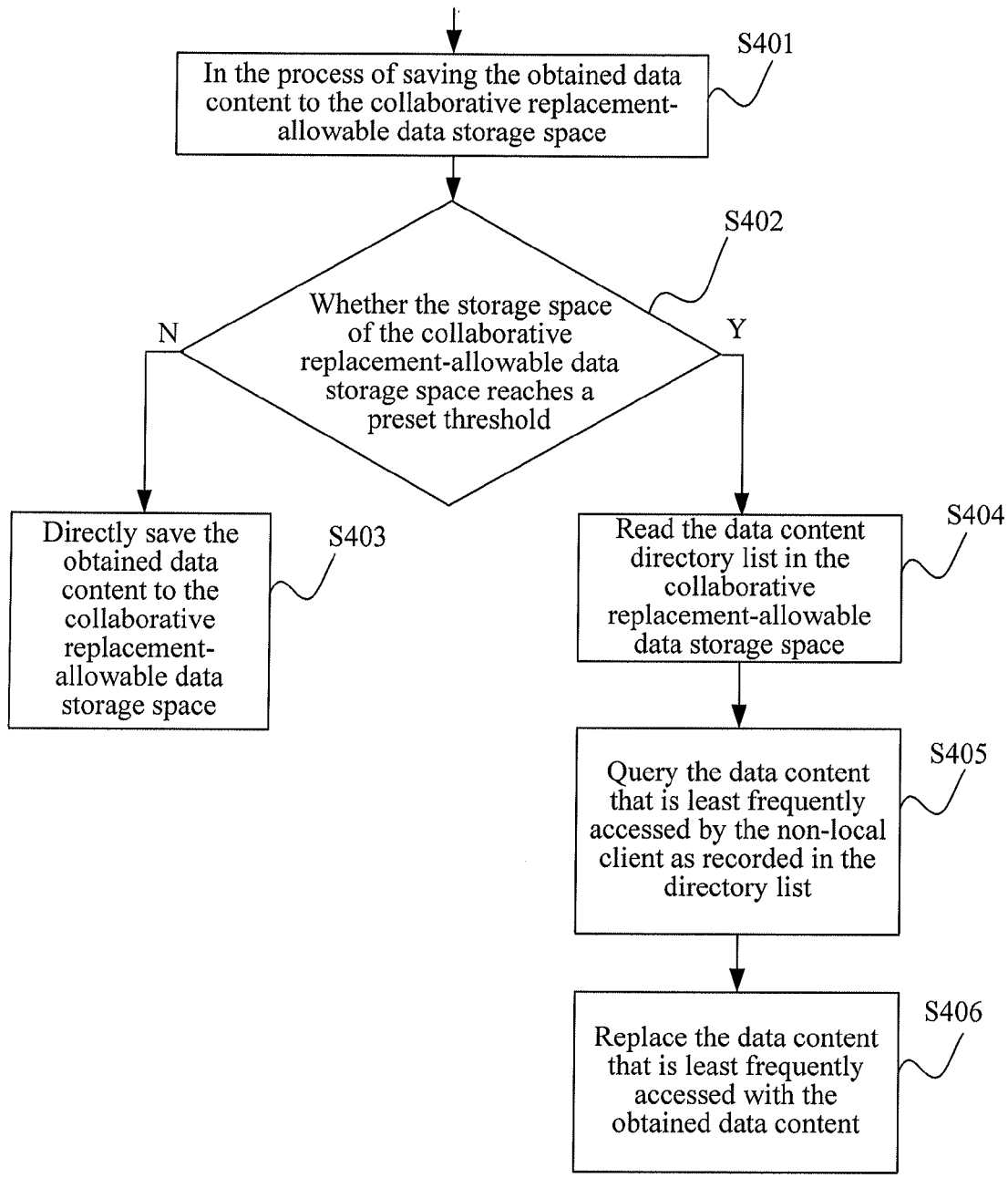
FIG. 5 is a processing flowchart of storing obtained data content to a collaborative replacement-allowable data storage space in a data processing method according to an embodiment of the present invention.

In the processing flow of the data processing method provided in the embodiment of the present invention, in the process of saving the data content obtained from the content source server to the collaborative replacement-allowable data storage space of the accessed cache node, because the storage capacity of the collaborative replacement-allowable data storage space of the cache node is limited, when the storage capacity of the collaborative replacement-allowable data storage space reaches a preset threshold, for example, the storage space of the collaborative replacement-allowable data storage space is full, it is required to replace data content in the collaborative replacement-allowable data storage space. The implementation is shown in FIG. 5 according to an embodiment of the present invention, and specifically includes the following steps:

Step S401: In the process of saving the obtained data content to the collaborative replacement-allowable data storage space, perform step S402 in real time: determine whether the storage space of the collaborative replacement-allowable data storage space reaches a preset threshold; if not, perform step S403; otherwise, perform step S404.

Step S403: Directly save the obtained data content to the collaborative replacement-allowable data storage space.

Step S404: Read the data content directory list in the collaborative replacement-allowable data storage space.

The data content directory list in the collaborative replacement-allowable data storage space records access frequency values of the data content which is stored in the collaborative replacement-allowable data storage space and which participates in the collaboration process of the cache node group.

Step S405: Query the data content that is least frequently accessed by the non-local client as recorded in the directory list.

Because the data content in the collaborative replacement-allowable data storage space is mainly used to participate in the data collaboration in the cache node group, the data content that is least frequently accessed by the non-local client is first considered in the replacement process. The data content that is least frequently accessed by a non-local client may also be data content that is least frequently accessed in the collaborative replacement-allowable data storage space, among all the data content accessed by the local client and the non-local client.

Step S406: Replace the data content that is least frequently accessed with the obtained data content.

Figure 6:
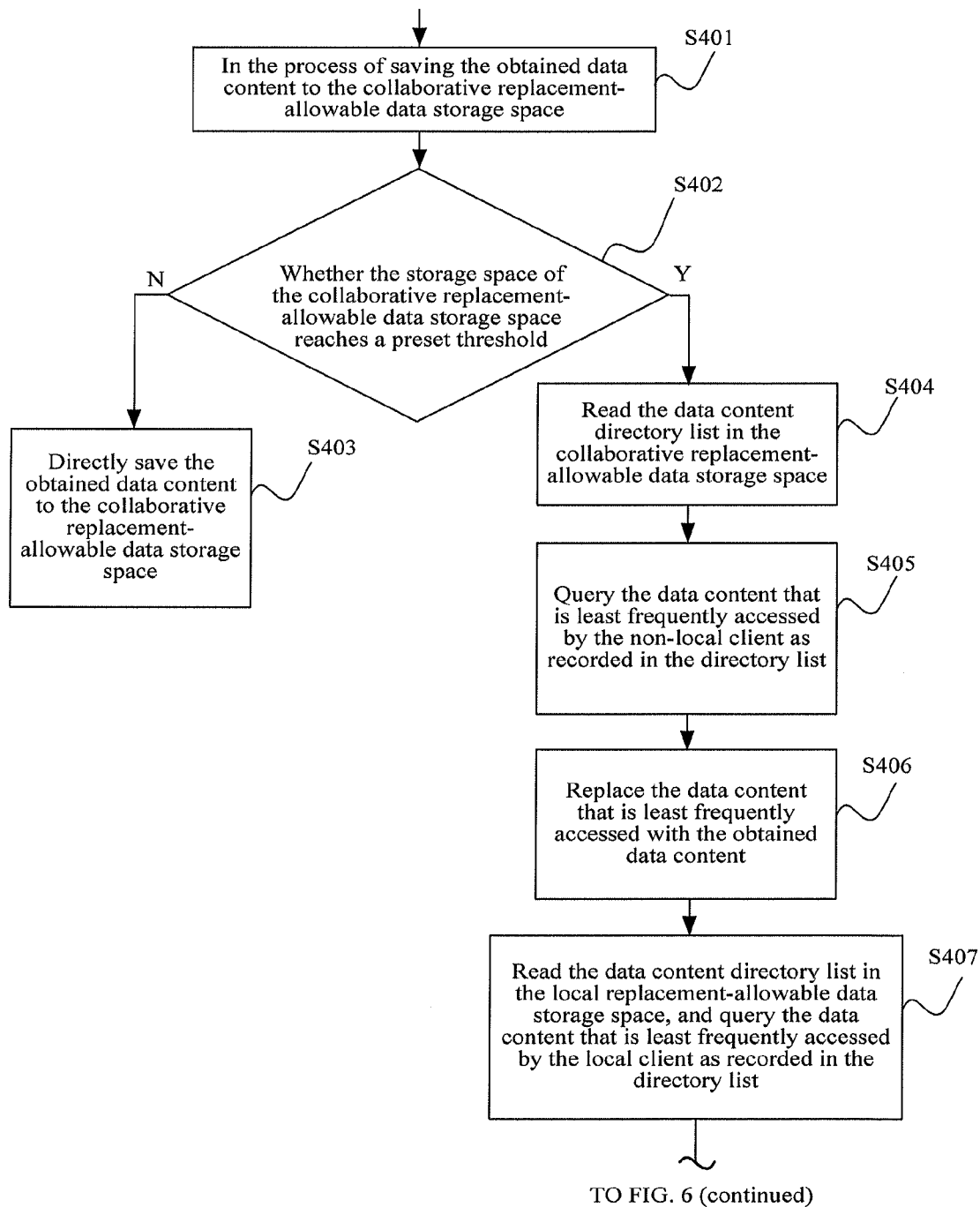
FIG. 6 is a detailed processing flowchart of storing obtained data content to a collaborative replacement-allowable data storage space in a data processing method according to an embodiment of the present invention.
Figure 6:
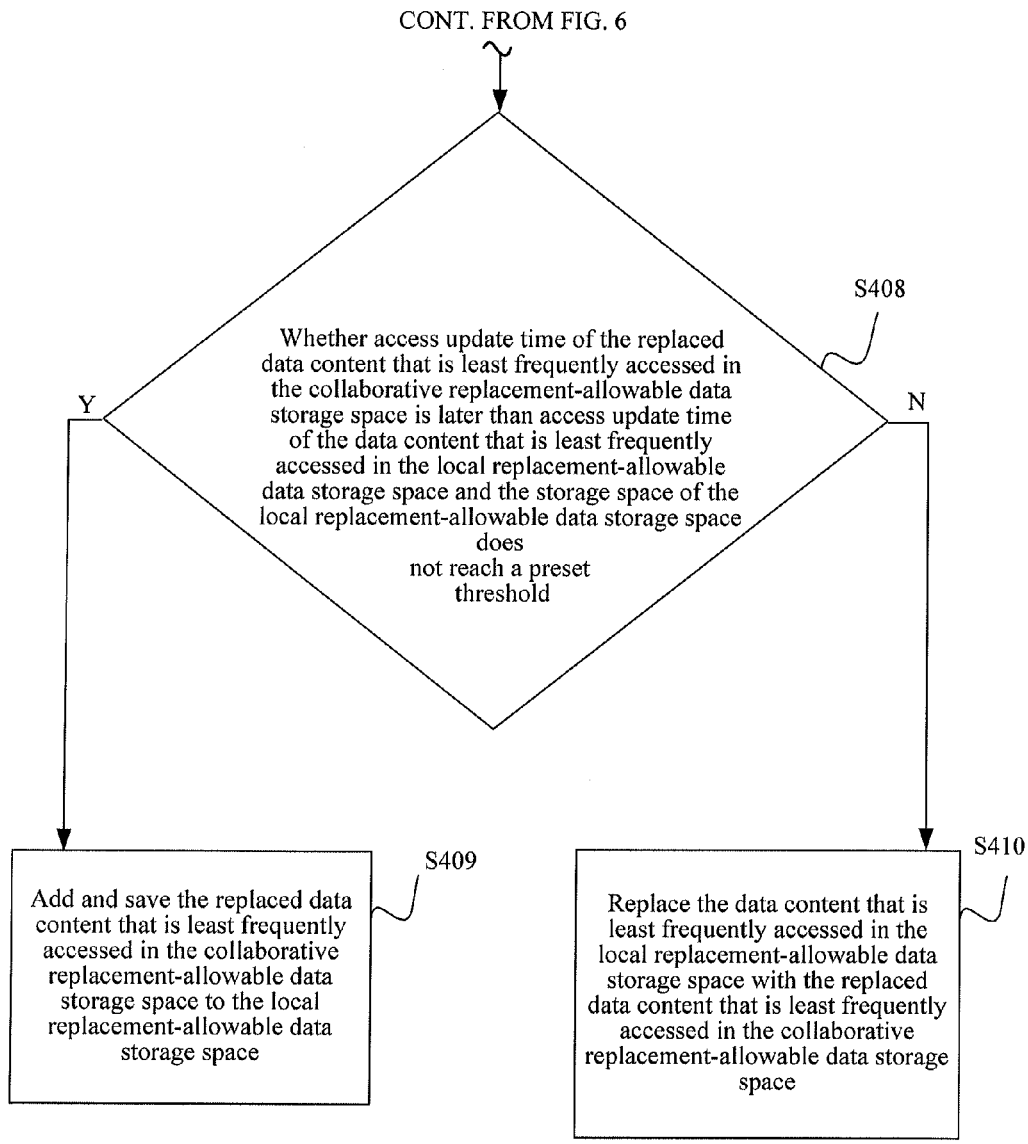

In the embodiment of the present invention, to prevent wasting data resources and reduce the link utilization ratio, the replaced data content in the collaborative replacement-allowable data storage space in FIG. 5 is reprocessed. As shown in FIG. 6, after step S406 in FIG. 5, the following steps are included:

Step S407: Read the data content directory list in the local replacement-allowable data storage space of the cache node, and query the data content that is least frequently accessed by the local client as recorded in the directory list.

A data content directory list is also set in the local replacement-allowable data storage space of the cache node provided in the embodiment of the present invention, and is used to record data content stored in the local replacement-allowable data storage space, and also record a frequency at which each piece of data content stored in the local replacement-allowable data storage space is accessed by the local client, and the update time of each piece of data content.

Step S408: Determine whether access time of the replaced data content that is least frequently accessed in the collaborative replacement-allowable data storage space is later than access time of the data content that is least frequently accessed in the local replacement-allowable data storage space and whether the storage space of the local replacement-allowable data storage space reach a preset threshold. If the results of the above two determinations are both yes, perform step S409; otherwise, perform step S410.

Two determining conditions are required for performing step S408. One is whether the access time of the replaced data content that is least frequently accessed in the collaborative replacement-allowable data storage space is later than the access time of the data content that is least frequently accessed in the local replacement-allowable data storage space, and the other one is whether the storage space of the local replacement-allowable data storage space reaches a preset threshold.

The conditions for performing step S409 in the embodiment of the present invention are that: the access time of the replaced data content that is least frequently accessed in the collaborative replacement-allowable data storage space is later than the access time of the data content that is least frequently accessed in the local replacement-allowable data storage space, and the storage space of the local replacement-allowable data storage space does not reach the preset threshold.

The conditions for performing step S410 in the embodiment of the present invention are that: the access time of the replaced data content that is least frequently accessed in the collaborative replacement-allowable data storage space is later than the access time of the data content that is least frequently accessed in the local replacement-allowable data storage space, and the storage space of the local replacement-allowable data storage space reaches the preset threshold.

Therefore, it can be known that in the process of performing step S409 and step S410, the access time of the replaced data content that is least frequently accessed in the collaborative replacement-allowable data storage space must be later than the access time of the data content that is least frequently accessed in the local replacement-allowable data storage space. If the condition is not met, the replaced data content in the collaborative replacement-allowable data storage space is deleted.

Step S409: Add and save the replaced data content that is least frequently accessed in the collaborative replacement-allowable data storage space to the local replacement-allowable data storage space.

Step S410: Replace the data content that is least frequently accessed in the local replacement-allowable data storage space with the replaced data content that is least frequently accessed in the collaborative replacement-allowable data storage space.

Figure 7:
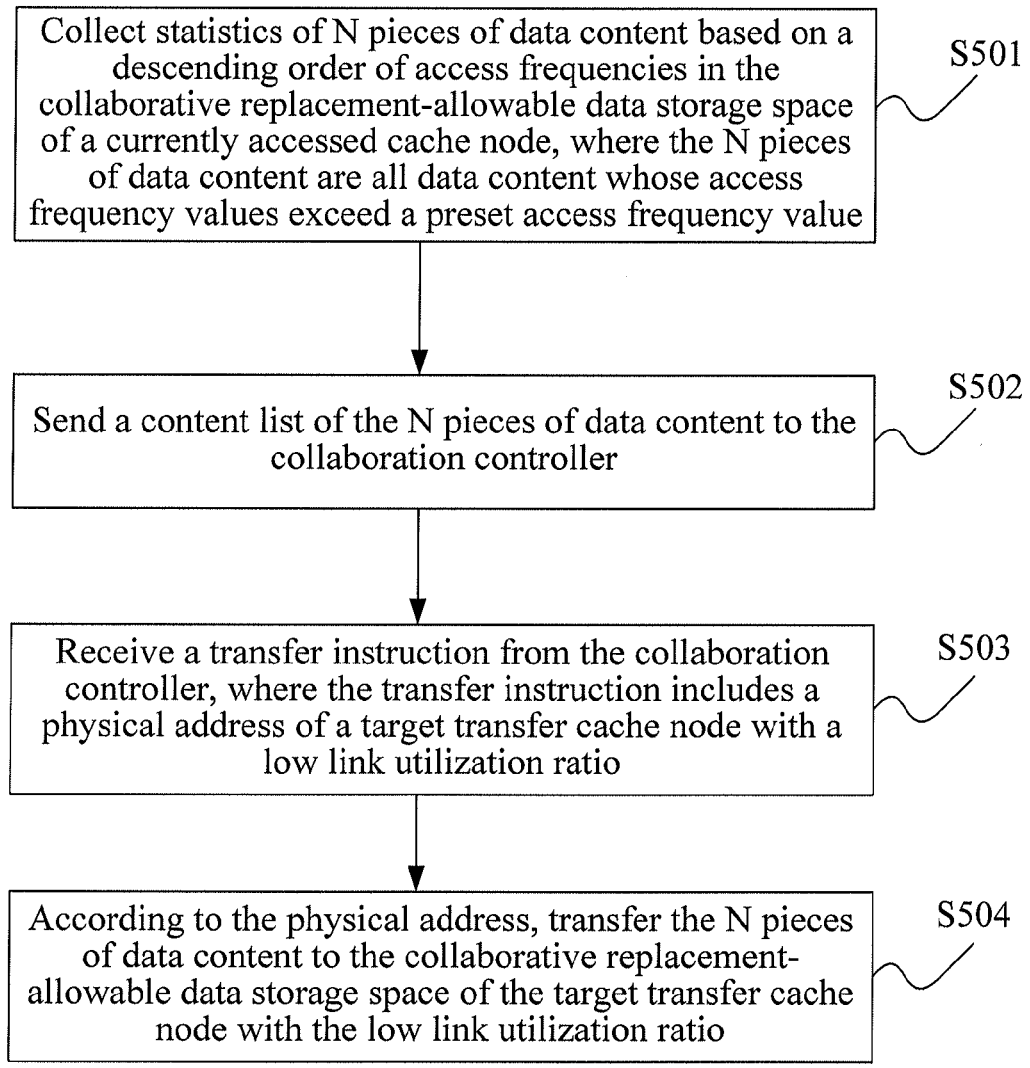
FIG. 7 is a flowchart of a method for transferring data content in a collaborative replacement-allowable data storage space in a data processing method according to an embodiment of the present invention.

In the foregoing implementation of the data processing method provided in the embodiment of the present invention, when the access frequency of data content in the collaborative replacement-allowable data storage space is too high, the replacement of the data content in the collaborative replacement-allowable data storage space is frequent; and the alternation between the content in the collaborative replacement-allowable data storage space and the content in the local replacement-allowable data storage space is frequent. As a result, the workload of the cache node is too heavy and the load is too high, and the link utilization ratio of a link where the cache node is located is too high, which indicates that in the cache node group, the proportion of a certain cache node participating in the collaboration is too high, while the one or more other cache nodes may be in an idle state. To balance the collaboration proportions of the cache nodes in the whole cache node group, in the data processing method provided in the embodiment of the present invention, when the utilization ratio of a link where a cache node is located exceeds a preset link utilization ratio, data content participating in collaboration in the cache node is transferred, as shown in FIG. 7.

Step S501: Collect statistics of N pieces of data content based on a descending order of access frequencies in the collaborative replacement-allowable data storage space of a currently accessed cache node, where the N pieces of data content are all data content whose access frequency values exceed a preset access frequency value.

If the utilization ratio of a certain link where a cache node is located is high, it indicates that the workload of the cache node is too heavy and the number of pieces of data content participating in collaboration is too great. At this time, statistics of the pieces of data content with high access frequencies, that is, the pieces of data content that frequently participate in collaboration in the collaborative replacement-allowable data storage space of the accessed cache node are collected. The pieces of data content with high access frequencies exceed a preset access frequency value, and it is assumed that there are N pieces of data content whose access frequencies exceed the preset access frequency value.

Step S502: Send a content list of the N pieces of data content to the collaboration controller.

Step S503: Receive a transfer instruction sent by the collaboration controller, where the transfer instruction includes a physical address of a target transfer cache node with a low link utilization ratio.

After receiving the directory list of the N pieces of data content to be transferred, the collaboration controller queries the whole record list, determines a cache node with a low collaboration proportion, that is, a cache node with a low link utilization ratio, as a target transfer cache node, and sends the physical address of the target transfer cache node to the accessed cache node.

Step S504: According to the physical address, transfer the N pieces of data content to the collaborative replacement-allowable data storage space of the target transfer cache node with the low link utilization ratio.

By transferring the data content in the collaborative replacement-allowable data storage space of the cache node with a high load, the link utilization ratio of the link where the cache node is located is reduced, thereby balancing the load of the cache node and the link utilization ratios of one or more other cache nodes in the cache node group.

For the method described in FIG. 7, after the transfer of the data content is completed, each cache node also updates the data content directory list in its collaborative replacement-allowable data storage space and sends the data content directory list to the collaboration controller.

Figure 8:
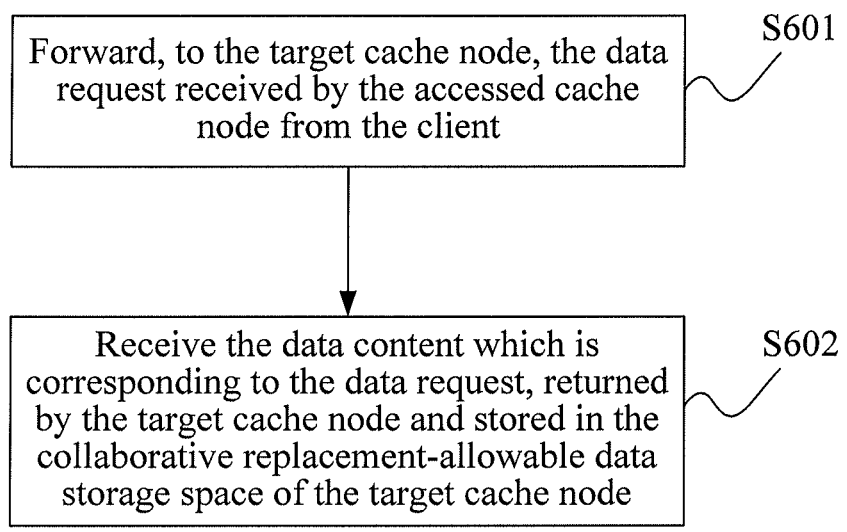
FIG. 8 is a flowchart of a method for obtaining data content from a target cache node in a data processing method according to an embodiment of the present invention.

The foregoing embodiments of the method mainly describe the process of processing the data content in the collaborative replacement-allowable data storage space of the cache node, and the process of processing data in the local replacement-allowable data storage space of the cache node is described as follows:

After the target cache node is determined by querying the data content directory list, as shown in FIG. 8 provided in an embodiment of the present invention, the following steps are included:

Step S601: Forward, to the target cache node, the data request received by the accessed cache node from the client.

Step S602: Receive the data content that is corresponding to the data request and is returned by the target cache node and stored in the collaborative replacement-allowable data storage space of the target cache node.

Figure 9:
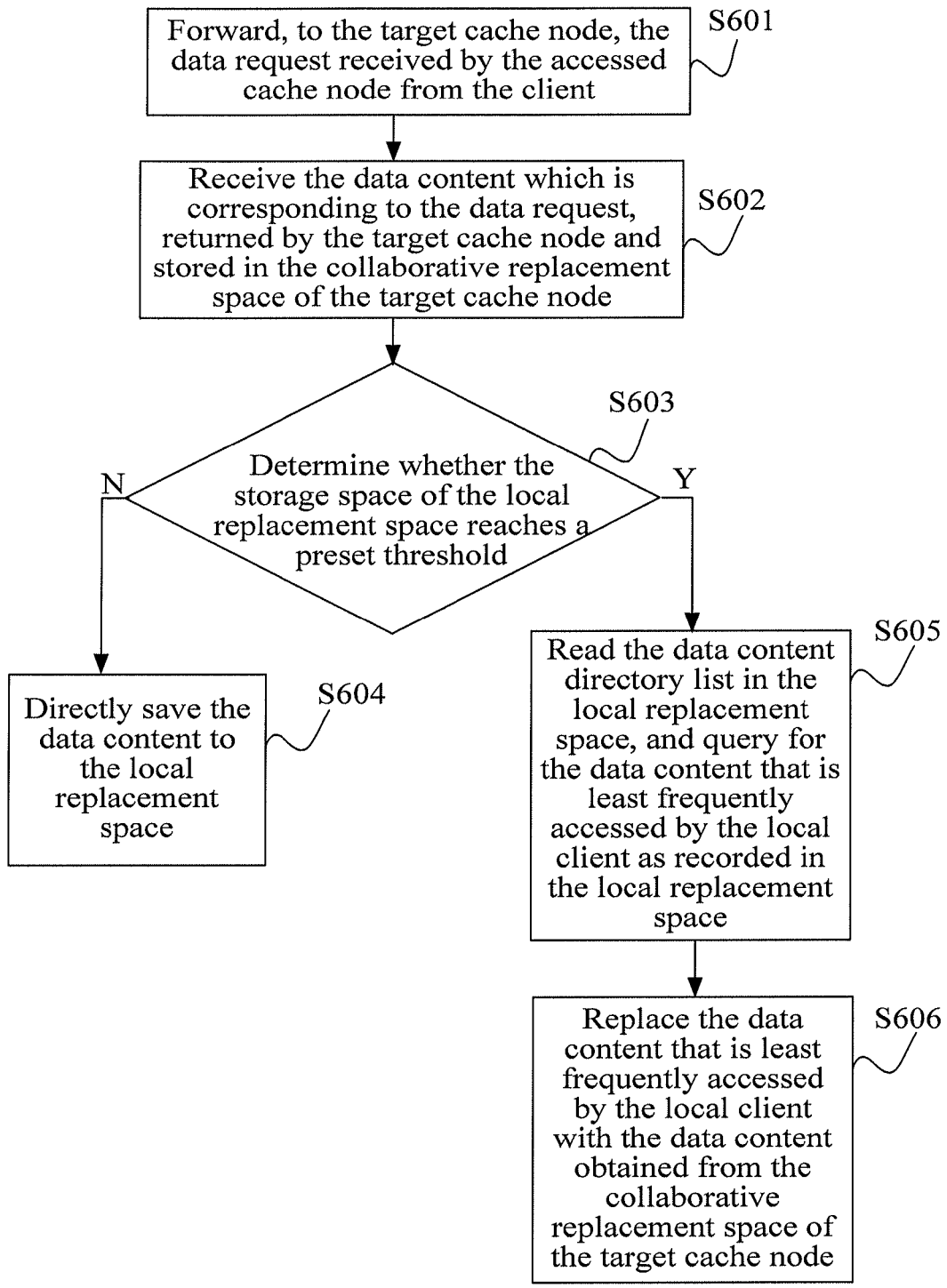
FIG. 9 is a processing flowchart of storing obtained data content to a local replacement-allowable data storage space according to an embodiment of the present invention.

After the data content returned by the target cache node is received, the process of adding the data content to the local replacement-allowable data storage space is implemented as shown in FIG. 9, which further includes the following steps:

Step S603: Determine whether the storage space of the local replacement-allowable data storage space reaches a preset threshold. If not, perform step S604; otherwise, perform step S605.

The storage space capacities of both the local replacement-allowable data storage space and the collaborative replacement-allowable data storage space in the cache node are limited.

Step S604: Directly save the data content to the local replacement-allowable data storage space.

Step S605: Read the data content directory list in the local replacement-allowable data storage space, and query the data content that is least frequently accessed by the local client as recorded in the local replacement-allowable data storage space.

When the content saved to the local replacement-allowable data storage space reaches a threshold, the previously stored data content needs to be replaced by the newly obtained data content. At this time, the data content that is least frequently accessed by the local client is replaced.

Step S606: Replace the data content that is least frequently accessed by the local client with the data content obtained from the collaborative replacement-allowable data storage space of the target cache node.

Figure 10:
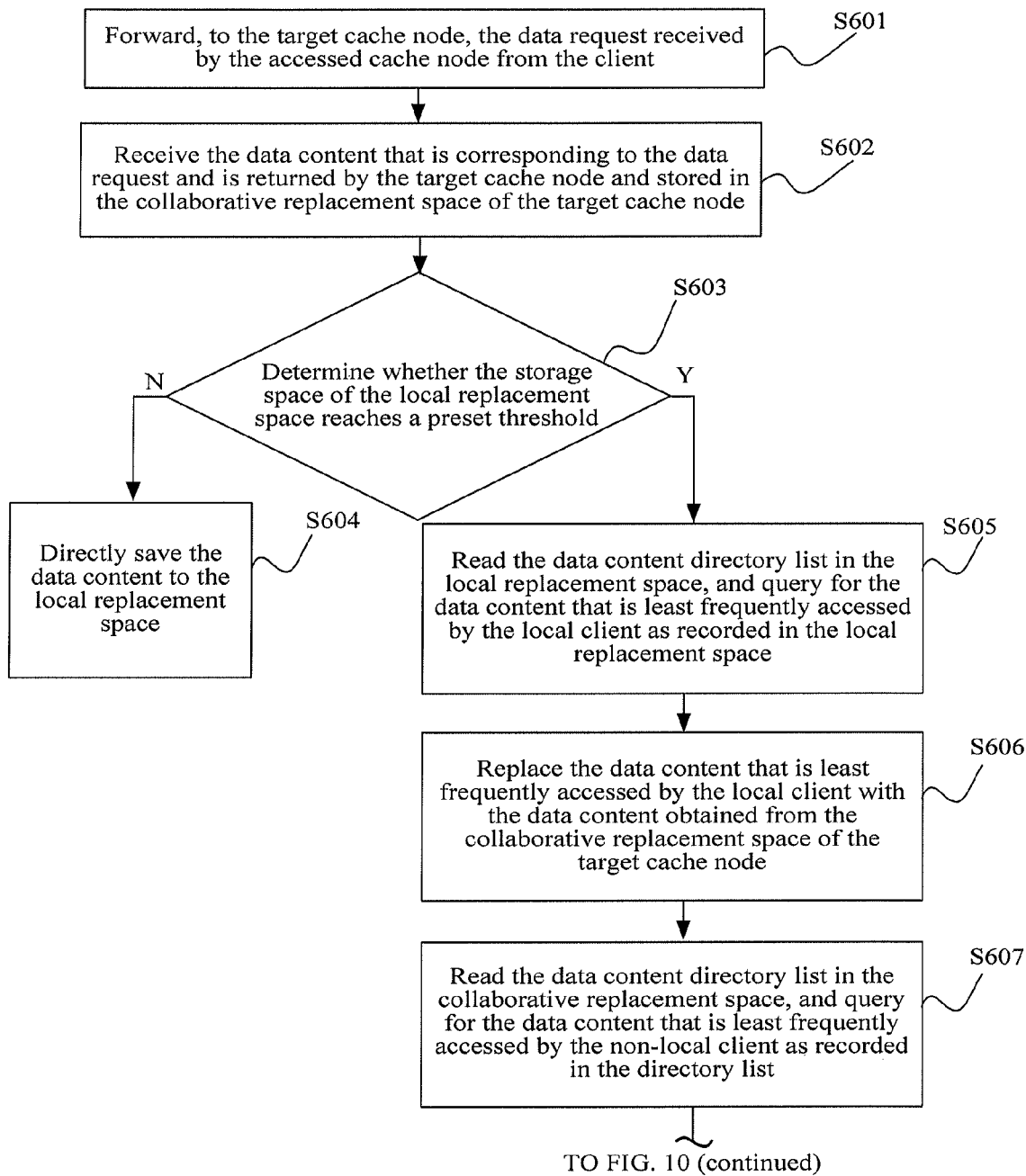
FIG. 10 is a detailed processing flowchart of storing obtained data content to a local replacement-allowable data storage space according to an embodiment of the present invention.
Figure 10:
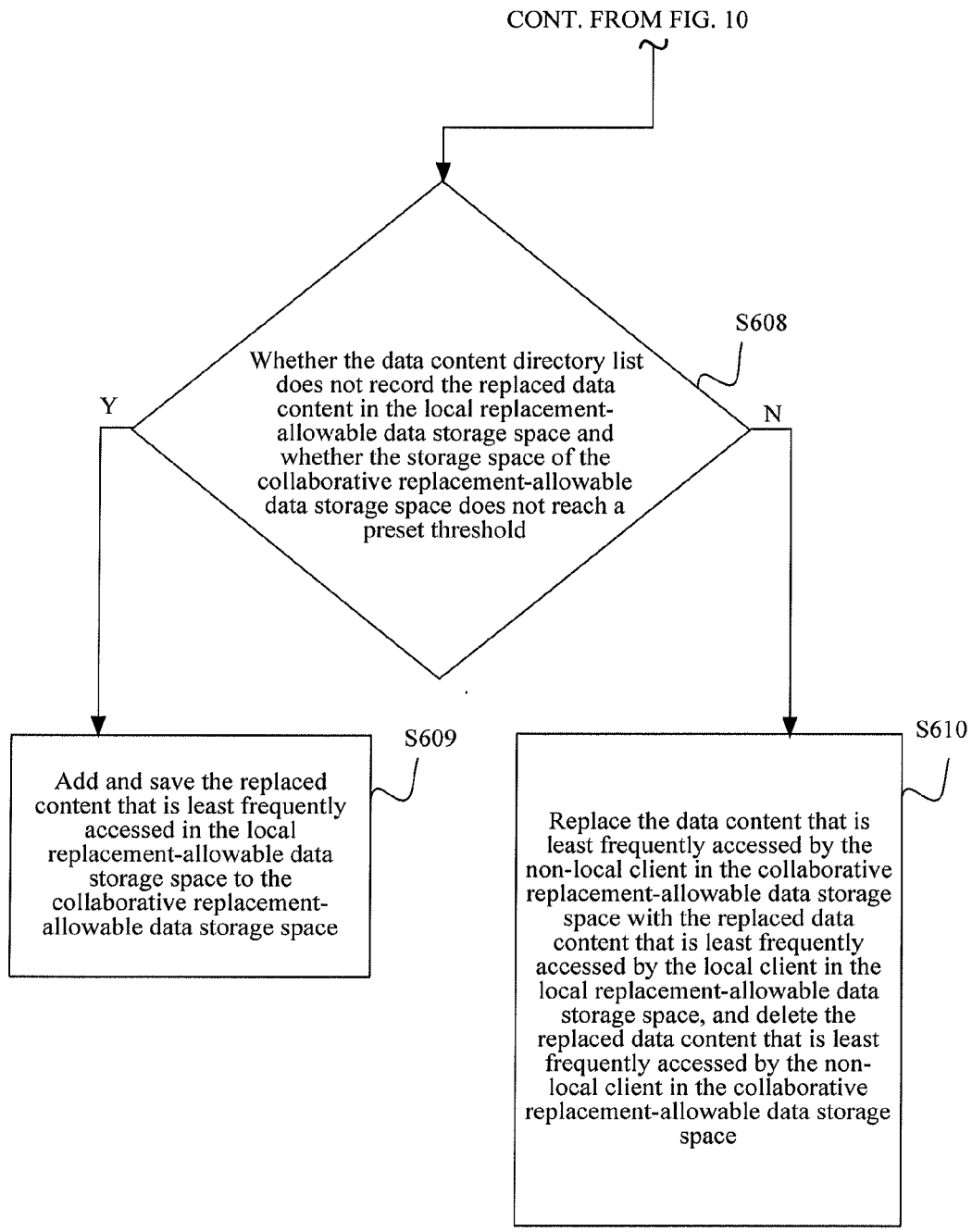

In the data processing method provided in the embodiment of the present invention, the replaced data content in the local replacement-allowable data storage space is not deleted directly but is reprocessed. As shown in FIG. 10, based on FIG. 9, after step S606 is performed, the following steps are included:

Step S607: Read the data content directory list in the collaborative replacement-allowable data storage space, and query the data content that is least frequently accessed by the non-local client as recorded in the directory list.

Step S608: Determine whether the data content directory list does not record the replaced data content in the local replacement-allowable data storage space and whether the storage space of the collaborative replacement-allowable data storage space does not reach a preset threshold. If yes, perform step S609; otherwise, perform step S610.

The conditions for performing the foregoing step S609 are that: the data content directory list in the collaborative replacement-allowable data storage space does not record the replaced data content in the local replacement-allowable data storage space and the storage space of the collaborative replacement-allowable data storage space does not reach the preset threshold.

The conditions for performing the foregoing step S610 are that: the data content directory list in the collaborative replacement-allowable data storage space records the replaced data content in the local replacement-allowable data storage space or the storage space of the collaborative replacement-allowable data storage space reaches the preset threshold.

Step S609: Add and save the replaced content that is least frequently accessed in the local replacement-allowable data storage space to the collaborative replacement-allowable data storage space.

Step S610: Replace the data content that is least frequently accessed by the non-local client in the collaborative replacement-allowable data storage space with the replaced data content that is least frequently accessed by the local client in the local replacement-allowable data storage space, and delete the replaced data content that is least frequently accessed by the non-local client in the collaborative replacement-allowable data storage space.

For the foregoing process of replacing the data content in the local replacement-allowable data storage space, it should be noted that when data content obtained from the target cache node is added to the local replacement-allowable data storage space and the local replacement-allowable data storage space reaches a preset threshold, it is required to replace the data content stored in the local replacement-allowable data storage space. In addition, when the replaced data content in the collaborative replacement-allowable data storage space can be added to the local replacement-allowable data storage space and the local replacement-allowable data storage space reaches a preset threshold, it is also required to replace the data content stored in the local replacement-allowable data storage space.

In the data processing method provided in the embodiment of the present invention, for the local replacement-allowable data storage space or the collaborative replacement-allowable data storage space of the cache node, when new content needs to be added to the local replacement-allowable data storage space or the collaborative replacement-allowable data storage space and the storage capacity of the local replacement-allowable data storage space or the collaborative replacement-allowable data storage space reaches a preset threshold, a corresponding data content replacement process is performed. For example, when data content obtained from a content source server is added to the collaborative replacement-allowable data storage space, the replacement is performed if the storage capacity of the collaborative replacement-allowable data storage space reaches a preset threshold. In addition, when another cache node transfers data content to the collaborative replacement-allowable data storage space of the cache node due to a too heavy load, if the storage capacity of the collaborative replacement-allowable data storage space of the cache node reaches a preset threshold, a corresponding replacement process is also performed.

In the data processing method provided in the embodiment of the present invention, for data content stored in the collaborative replacement-allowable data storage space and the local replacement-allowable data storage space of the cache node, the data content stored in the collaborative replacement-allowable data storage space is mainly used for data collaboration in the cache node group, and data content stored in the local replacement-allowable data storage space is used for access demands of the local client. For a specific cache node, when data content in the collaborative replacement-allowable data storage space is changed due to, for example, a replacement process, the replaced data content may be added to the local replacement-allowable data storage space accordingly; likewise, when data content in the local replacement-allowable data storage space is changed, the replaced data content may also be added to the collaborative replacement-allowable data storage space accordingly. Through the interaction between the collaborative replacement-allowable data storage space and the local replacement-allowable data storage space, a single cache node is capable of better meeting optimization requirements of the cache node itself during the local access and participation in the collaboration. Meanwhile, for a cache node group, under the control of the collaboration controller, each cache node better participates in the collaboration, making the global collaboration better.

Figure 11:
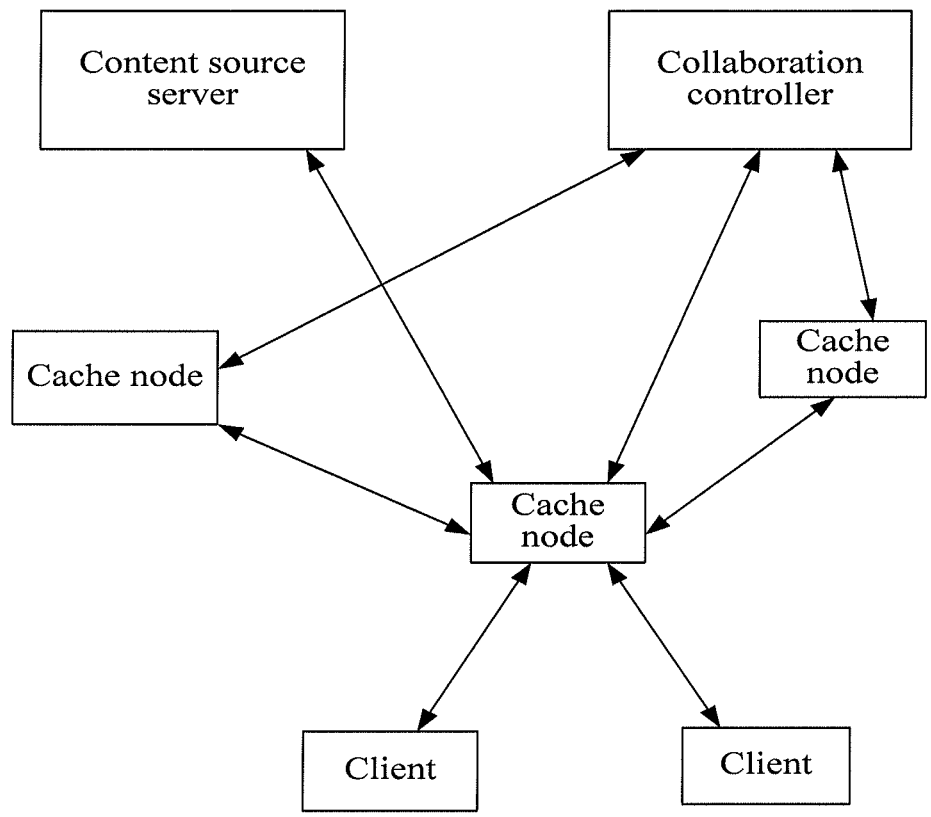
FIG. 11 is a schematic diagram of an application environment of a cache node according to an embodiment of the present invention.
Figure 12:
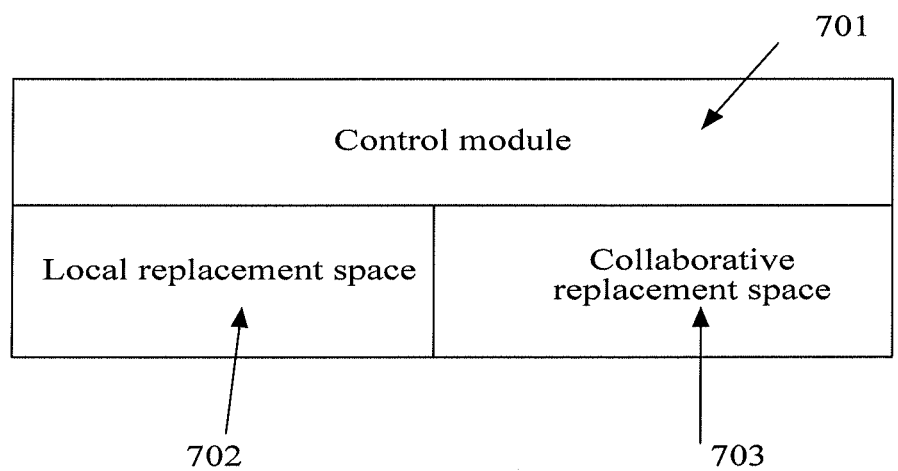
FIG. 12 is a schematic structural diagram of a cache node according to an embodiment of the present invention.

The embodiment of the data processing method provided in the embodiments of the present invention is described above, and for the embodiment of the method, the present invention also provides a corresponding cache node accordingly. FIG. 11 provided in an embodiment of the present invention shows an application environment of the cache node. A single local cache node may interact with multiple local clients, and meanwhile, the cache node may implement data interaction with a content source server, a collaboration controller, and one or more other cache nodes in the cache node group. FIG. 12 is a schematic structural diagram of a cache node according to an embodiment of the present invention, which includes a control module 701, a local replacement-allowable data storage space 702, and a collaborative replacement-allowable data storage space 703;

where, the local replacement-allowable data storage space 702 is used for storing data accessed by a local client;

the collaborative replacement-allowable data storage space 703 is used for storing data content accessed by a non-local client; and the control module 701 is configured to receive a data request sent by a client, and search, in the local replacement-allowable data storage space, for data content corresponding to the data request; when the data content is not found in the local replacement-allowable data storage space, query a mapping relationship between data content and corresponding cache nodes that store the data content, where the mapping relationship is set in a data content directory list, and according to the mapping relationship, use a cache node containing the data content among one or more other cache nodes in the cache node group as a target cache node; and obtain the data content from a collaborative replacement-allowable data storage space of the target cache node, and store the data content to the local replacement-allowable data storage space.

Figure 13:
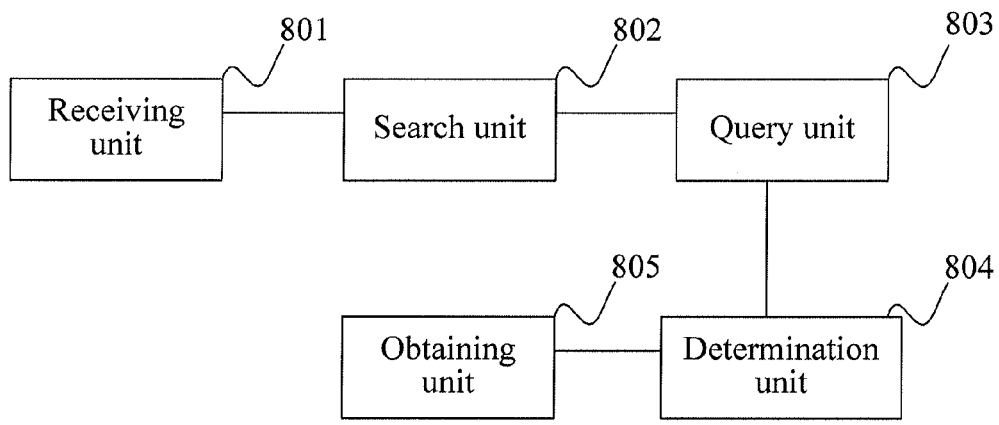
FIG. 13 is a first schematic structural diagram of a control module in a cache node according to an embodiment of the present invention.

Meanwhile, the control module 701 is further configured to receive a control command sent by a collaboration controller and adjust proportions of the local replacement-allowable data storage space and the collaborative replacement-allowable data storage space of the cache node. To describe the cache node provided in the embodiment of the present invention more clearly, the structure of the control module 701 is detailed. As shown FIG. 13, an internal structure of the control module 701 includes:

a receiving unit 801, a search unit 802, a query unit 803, a determination unit 804, and an obtaining unit 805;

where, the receiving unit 801 is configured to receive the data request sent by the client;

the search unit 802 is configured to search, in the local replacement-allowable data storage space 702, for the data content corresponding to the data request according to the data request received by the receiving unit 801;

the query unit 803 is configured to query the mapping relationship between data content and corresponding cache nodes that store the data content, where the mapping relationship is set in the data content directory list when the search unit 802 does not find the data content in the local replacement-allowable data storage space 702;

the determination unit 804 is configured to determine, according to the mapping relationship, a cache node containing the data content among one or more other cache nodes in the cache node group as a target cache node, when the query unit 803 finds the mapping relationship between data content and corresponding cache nodes that store the data content; and the obtaining unit 805 is configured to obtain the data content from the collaborative replacement-allowable data storage space 703 of the target cache node determined by the determination unit 804, and store the data content to the local replacement-allowable data storage space 702.

Figure 14:
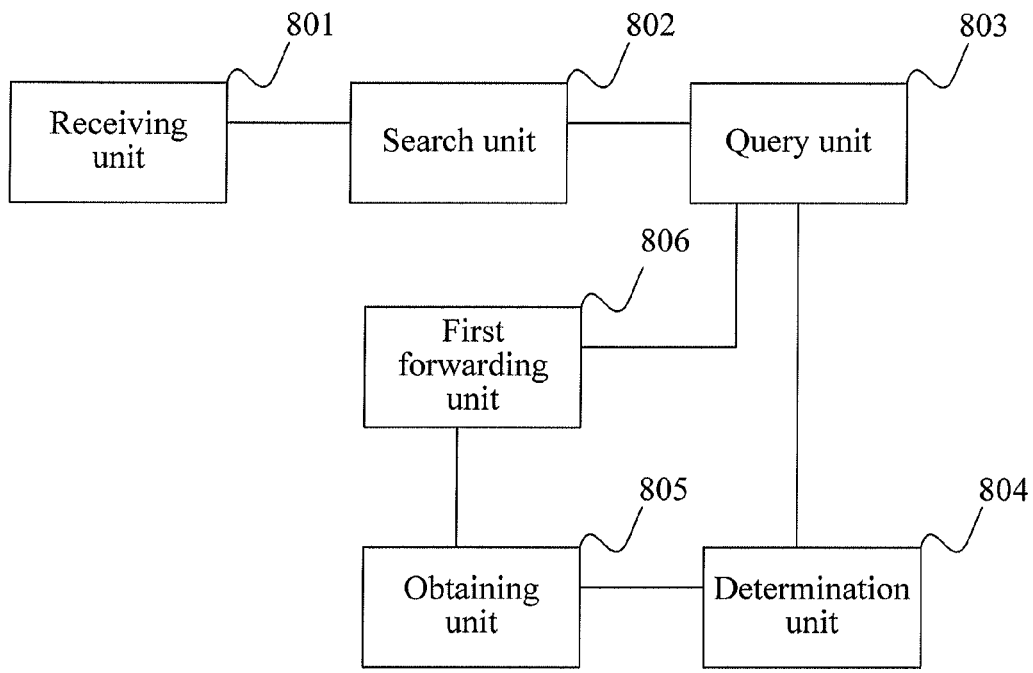
FIG. 14 is a second schematic structural diagram of a control module in a cache node according to an embodiment of the present invention.

For the cache node provided in the embodiment of the present invention, when the query unit 802 does not find the mapping relationship between data content and corresponding cache nodes that store the data content in the data content directory list, the cache node needs to forward the data request received by the receiving unit 801 to a content source server. Therefore, a first forwarding unit 806 is also disposed in the cache node provided in the embodiment of the present invention. As shown in FIG. 14, the first forwarding unit 806 is configured to: when the query unit 803 does not find the mapping relationship between data content and corresponding cache nodes that store the data content, forward the data request received by the receiving unit 801 to a content source server, and control the obtaining unit 805 to obtain, from the content source server, the data content corresponding to the data request; and save the obtained data content to the collaborative replacement-allowable data storage space of the cache node.

Figure 15:
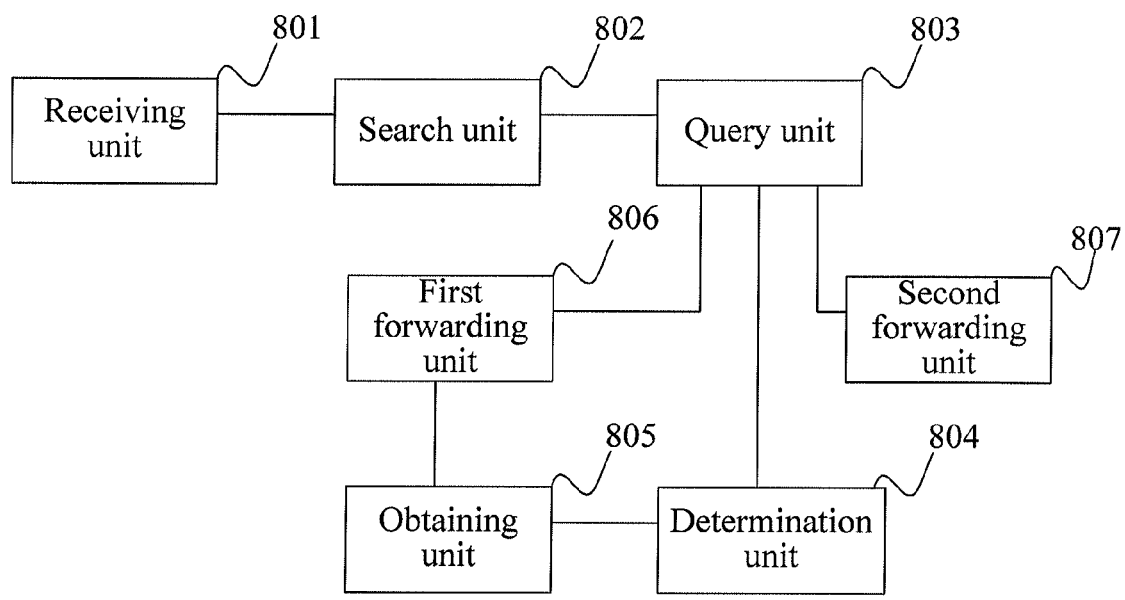
FIG. 15 is a third schematic structural diagram of a control module in a cache node according to an embodiment of the present invention.

When the determination unit determines the target cache node, the data request received from the client needs to be forwarded to the content source server. Therefore, a second forwarding unit 807 is also disposed in the cache node provided in the embodiment of the present invention, as shown in FIG. 15.

The second forwarding unit 807 is configured to: when the query unit 803 finds the mapping relationship between data content and corresponding cache nodes that store the data content, forward the data request received by the receiving unit 801 to the target cache node determined by the determination unit 804, and control the obtaining unit 805 to obtain, from the collaborative replacement-allowable data storage space of the target cache node, the data content corresponding to the data request; and save the obtained data content to the local replacement-allowable data storage space of the cache node.

Figure 16:
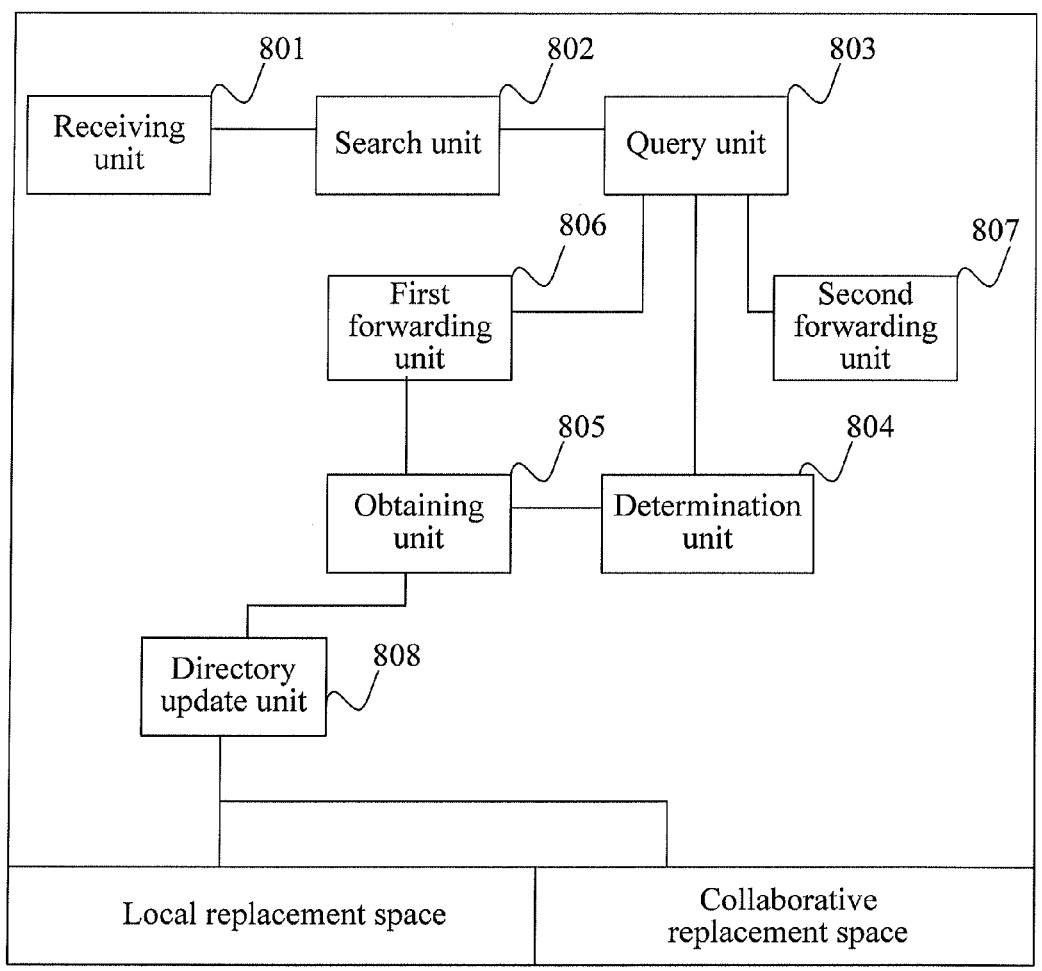
FIG. 16 is a fourth schematic structural diagram of a control module in a cache node according to an embodiment of the present invention.

The cache node provided in the embodiment of the present invention updates a data directory in the collaborative replacement-allowable data storage space or the local replacement-allowable data storage space when data content of the collaborative replacement-allowable data storage space or the local replacement-allowable data storage space is changed. Therefore, a directory update unit is also disposed in the cache node provided in the embodiment of the present invention, as shown in FIG. 16.

The directory update unit 808 is configured to update a directory list of data content stored in the local replacement-allowable data storage space or the collaborative replacement-allowable data storage space and send the updated directory list of the collaborative replacement-allowable data storage space to the collaboration controller, when content stored in the local replacement-allowable data storage space or the collaborative replacement-allowable data storage space is changed.

Figure 17:
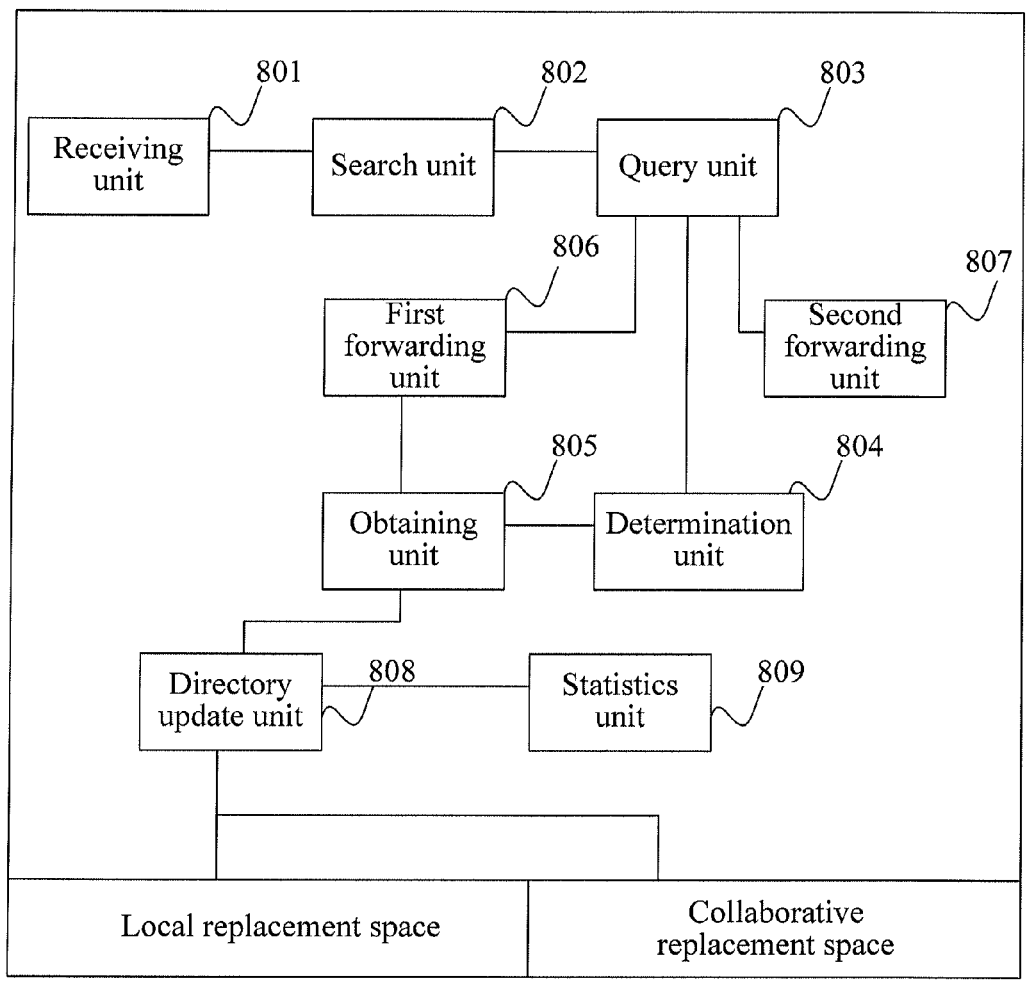
FIG. 17 is a fifth schematic structural diagram of a control module in a cache node according to an embodiment of the present invention.

For the data content stored in the collaborative replacement-allowable data storage space or the local replacement-allowable data storage space, a statistics unit 809 is also disposed in the cache node provided in the embodiment of the present invention. As shown FIG. 17, the statistics unit 809 is configured to collect statistics of access frequencies of the data content stored in the local replacement-allowable data storage space or the collaborative replacement-allowable data storage space.

Figure 18:
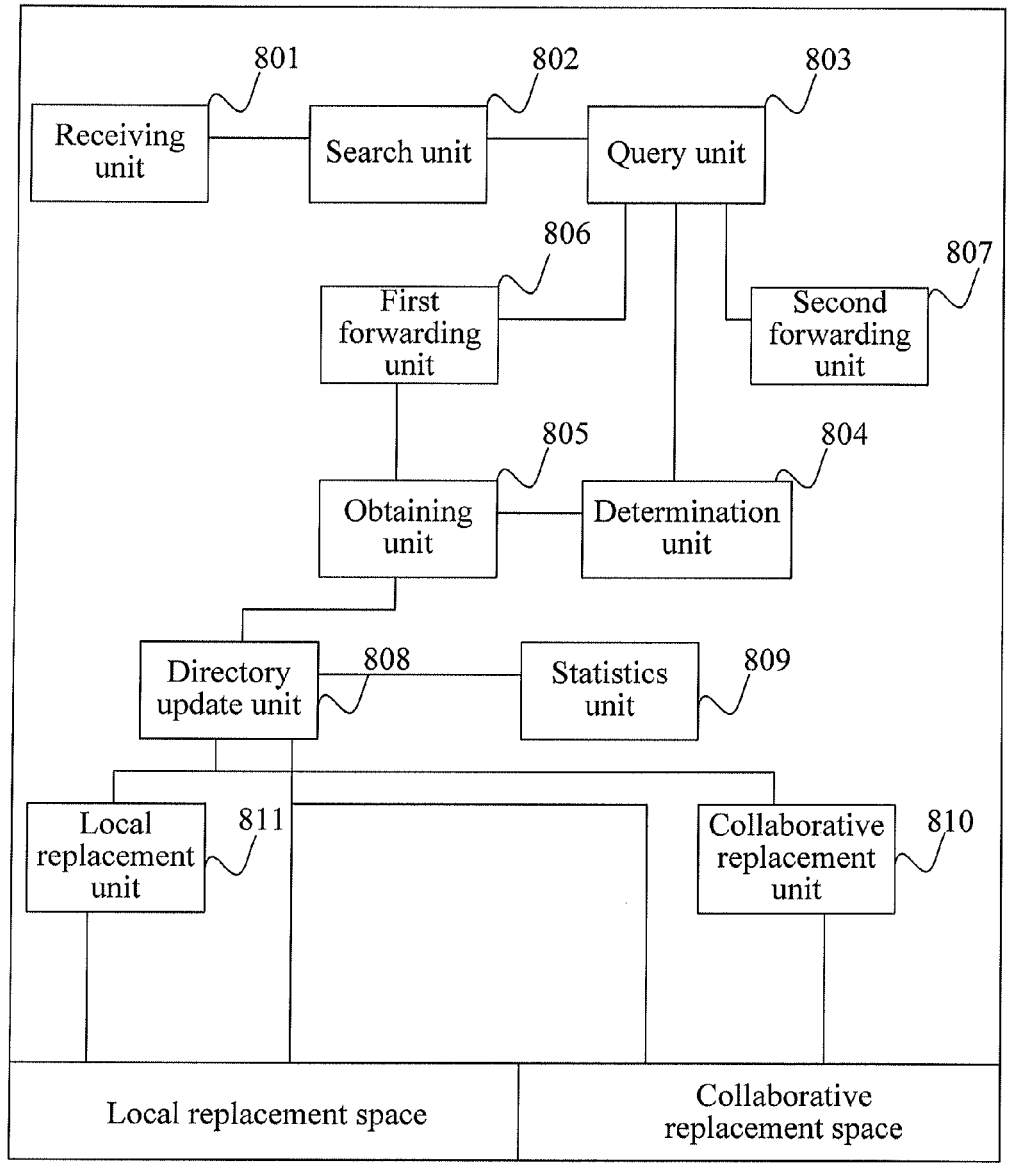
FIG. 18 is a sixth schematic structural diagram of a control module in a cache node according to an embodiment of the present invention.

For the cache node provided in the embodiment of the present invention, the storage capacities of the local replacement-allowable data storage space and the collaborative replacement-allowable data storage space are limited, and when the data content stored in the local replacement-allowable data storage space or the collaborative replacement-allowable data storage space exceeds a preset threshold, it is required to replace the data content stored in the local replacement-allowable data storage space or the collaborative replacement-allowable data storage space. Therefore, a local replacement unit 811 and a collaborative replacement unit 810 are also disposed in the cache node provided in the embodiment of the present invention, as shown in FIG. 18.

The collaborative replacement unit 810 is configured to manage a process in which the non-local client accesses to the collaborative replacement-allowable data storage space, and in the process in which the obtaining unit 805 stores the obtained data content to the collaborative replacement-allowable data storage space, replace the data content in the collaborative replacement-allowable data storage space when a storage space of the collaborative replacement-allowable data storage space reaches a preset threshold.

The local replacement unit 811 is configured to manage a process in which the local client accesses to the local replacement-allowable data storage space, and in the process in which the obtaining unit 805 stores the obtained data content to the local replacement-allowable data storage space, replace the data content in the local replacement-allowable data storage space when a storage space of the local replacement-allowable data storage space reaches a preset threshold.

Figure 19:
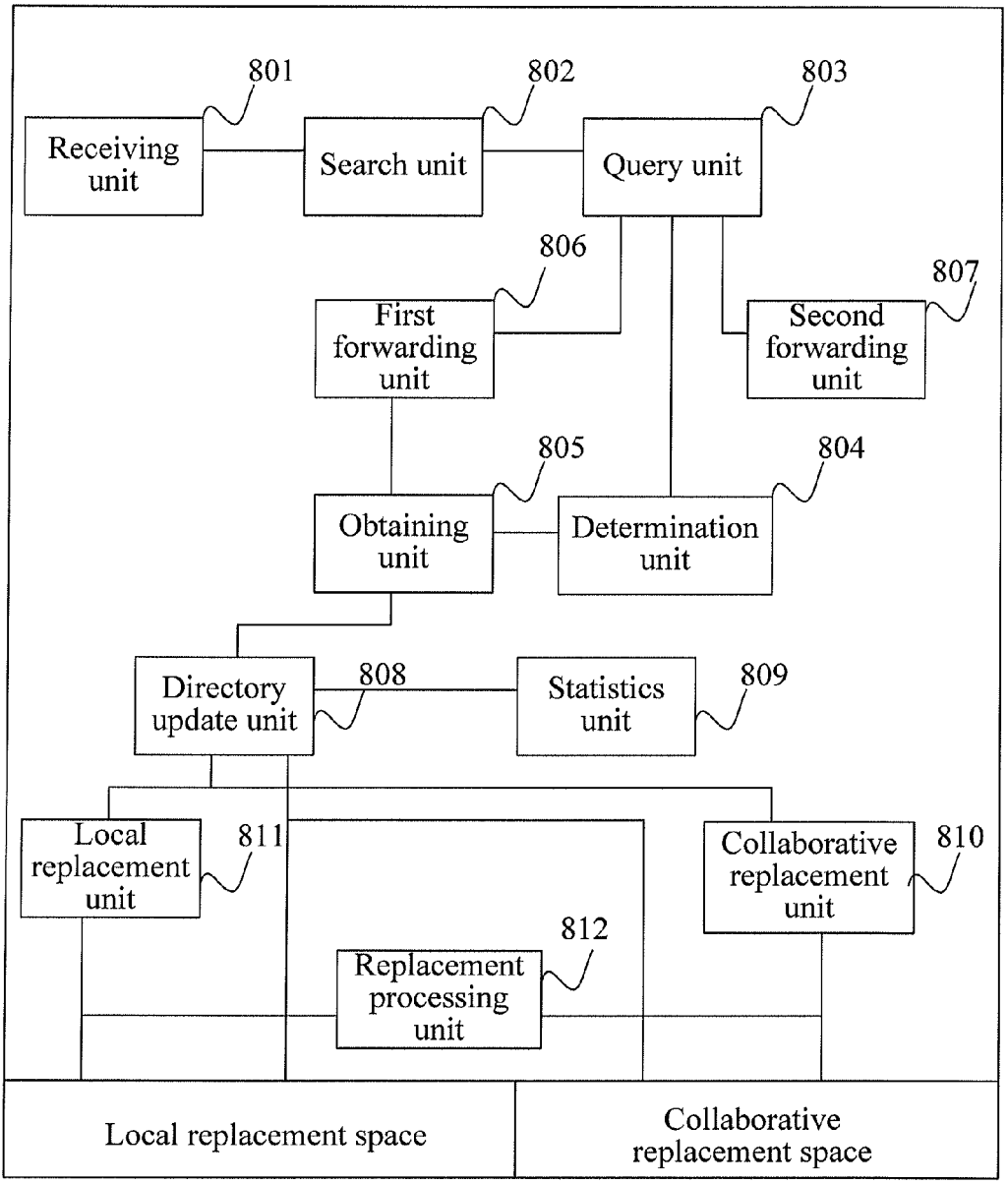
FIG. 19 is a seventh schematic structural diagram of a control module in a cache node according to an embodiment of the present invention.

For the replaced data content, a replacement processing unit 812 is also disposed in the cache node provided in the embodiment of the present invention. As shown in FIG. 19, the replacement processing unit 812 is configured to process the replaced data content in the local replacement-allowable data storage space or the collaborative replacement-allowable data storage space. For the specific processing flow, refer to the flow of processing the replaced data content in the embodiment of the data processing method provided in the present invention.

Figure 20:
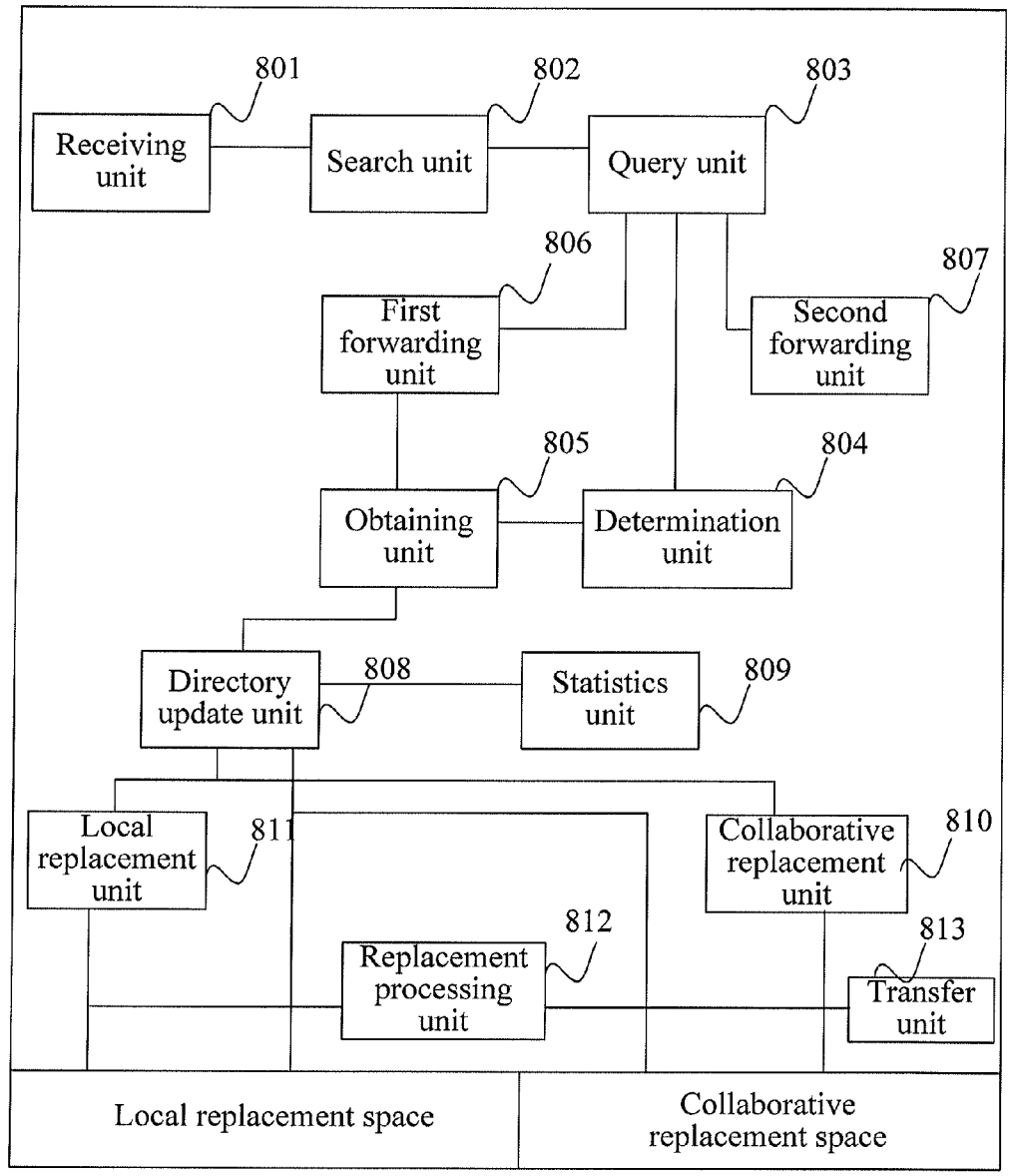
FIG. 20 is an eighth schematic structural diagram of a control module in a cache node according to an embodiment of the present invention.

For the cache node provided in the embodiment of the present invention, when the number of times of the cache node being accessed is too great and the data content participating in collaboration exceeds a preset threshold so that a utilization ratio of a link where the cache node is located is too high, a transfer unit 813 is also disposed in the cache node provided in the embodiment of the present invention, as shown in FIG. 20.

The transfer unit 813 is configured to transfer the data content stored in the collaborative replacement-allowable data storage space of the cache node, when a utilization ratio of a link where the cache node is located exceeds a preset link utilization ratio.

The specific structure of the cache node provided in the embodiment of the present invention is described above. The cache node provided in the embodiment of the present invention has a distinct structure, and has a higher adjustment capability when participating in data collaboration.

Figure 21:
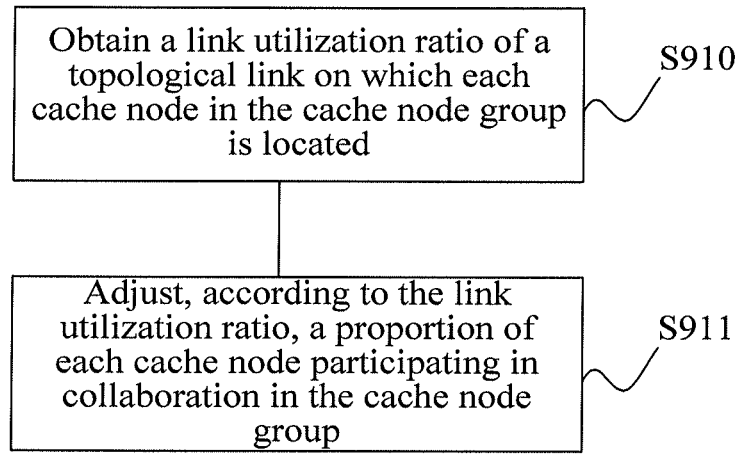
FIG. 21 illustrates a data processing method applied at a collaboration controller side according to an embodiment of the present invention.

The data processing method and the corresponding cache node described above are applied in the cache node group. Meanwhile, an embodiment of the present invention provides a data processing method for a cache node group and each cache node in the cache node group. The method is applied at a collaboration controller side, and FIG. 21 shows a processing flow of the method, including the following steps:

Step S910: Obtain a link utilization ratio of a topological link on which each cache node in the cache node group is located.

Step S911: Adjust, according to the link utilization ratio, a proportion of each cache node participating in collaboration in the cache node group.

In the foregoing processing method provided in the embodiment of the present invention, link utilization ratios of the network topology are collected, and control command information indicating a different degree of participation in collaboration is sent to each cache node according to the difference of the link utilization ratios, so as to balance the link bandwidth utilization ratio of the network where the whole cache node group is located.

In the data processing method provided in the embodiment of the present invention, the process of obtaining the link utilization ratio of each cache node in the cache node group may be implemented in various manners, for example, the collaboration controller proactively collects the link utilization ratio of each cache node in the cache node group; or each cache node in the cache node group proactively reports its link utilization ratio; or a third-party collection device is set, and the third-party collection device collects the link utilization ratio of each cache node and sends the collected link utilization ratios to the collaboration controller.

Figure 22:
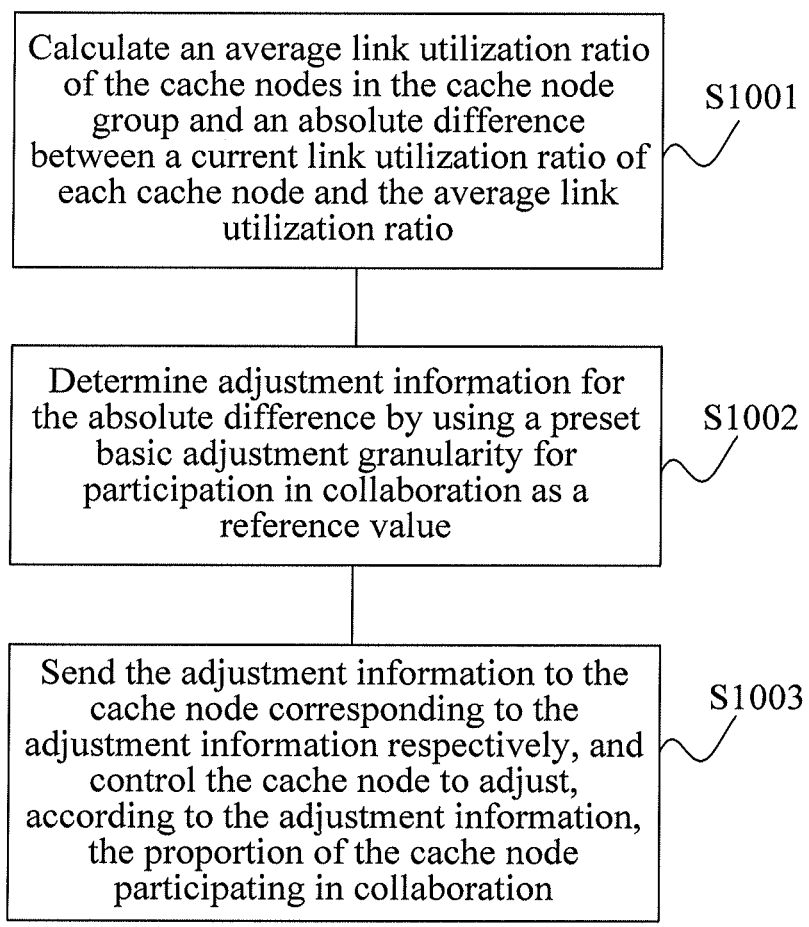
FIG. 22 is a flowchart of a method for adjusting a collaboration proportion of a cache node in a data processing method according to an embodiment of the present invention.

In the data processing method provided in the embodiment of the present invention, the process of adjusting the proportion of each cache node participating in collaboration in the cache node group is shown in FIG. 22, including the following steps:

Step S1001: Calculate an average link utilization ratio of each cache node in the cache node group and an absolute difference between a current link utilization ratio of each cache node and the average link utilization ratio.

The absolute difference is a difference range between the current link utilization ratio and the average link utilization ratio, that is, a difference by which the current link utilization ratio is higher than the average link utilization ratio or a difference by which the current link utilization ratio is lower than the average link utilization ratio.

Step S1002: Determine adjustment information for the absolute difference by using a preset basic adjustment granularity for participation in collaboration as a reference value.

A basic adjustment granularity is preset for an adjustment scale for participation in collaboration, and the basic adjustment granularity is the minimum unit of adjustment.

Step S1003: Send the adjustment information to a cache node corresponding to the adjustment information, and control the cache node to adjust, according to the adjustment information, the proportion of the cache node participating in collaboration.

In the process of performing the foregoing steps, the average link utilization ratio of each cache node is calculated. When the link utilization ratio of a cache node is higher than a threshold of the average link utilization ratio, it is required to reduce the proportion of the cache node, which is bound to the link, participating in collaboration. For example, if the proportion 5% is used as the basic adjustment granularity, when the utilization ratio of a link is higher than the average link utilization ratio by N times the basic adjustment granularity, the adjustment granularity is N*5%. When the utilization of a link is lower than a threshold of the average link utilization ratio, it is required to increase the proportion of the cache node, which is bound to the link, participating in collaboration. For example, if the proportion 5% is used as the basic adjustment granularity, when the link utilization ratio is lower than the average link utilization ratio by N times the basic adjustment granularity, the adjustment granularity is N*5%.

In the data processing method provided in the embodiment of the present invention, the main process of adjusting the proportion of the cache node participating in collaboration is to transfer the data content with high access frequency in the collaborative replacement-allowable data storage space of the cache node. In the data processing method provided in the embodiment of the present invention, the determined adjustment information for the absolute difference includes adjustment direction information, and the adjustment direction information includes a transfer instruction for controlling transfer of the data content in the collaborative replacement-allowable data storage space of the cache node and a physical address of a target transfer cache node.

Figure 23:
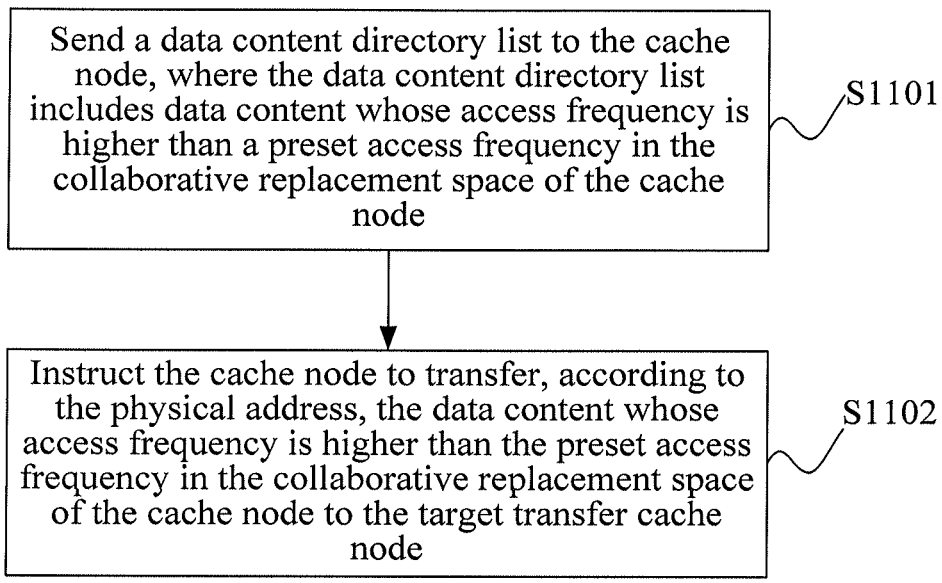
FIG. 23 is a flowchart of a method for controlling transfer of data content in a collaborative replacement-allowable data storage space of a cache node according to an embodiment of the present invention.

The process of controlling transfer of the data content in the collaborative replacement-allowable data storage space of the cache node according to the transfer instruction is shown in FIG. 23, including the following steps:

Step S1101: Send a data content directory list to the cache node, where the data content directory list includes data content whose access frequency is higher than a preset access frequency in the collaborative replacement-allowable data storage space of the cache node.

Step S1102: Instruct the cache node to transfer, according to the physical address, the data content whose access frequency is higher than the preset access frequency in the collaborative replacement-allowable data storage space of the cache node to the target transfer cache node.

After receiving the transfer instruction, the cache node transfers, according to the transfer instruction, the data content to be transferred to the target transfer cache node, then updates a data content directory list in its collaborative replacement-allowable data storage space, and uploads the updated data content cache list to the collaboration controller. The data processing method provided in the embodiment of the present invention further includes:

receiving a data content directory list uploaded by each cache node, where the data content directory list contains a directory of data content stored in the collaborative replacement-allowable data storage space of each cache node, and access frequency information of the data content; and statistically summarizing the data content directory list uploaded by each cache node and sending the summarized data content directory list to each cache node.

In the data processing method provided in the embodiment of the present invention, the data content directory list is updated in real time. In any processing stage, once data content in the collaborative replacement-allowable data storage space of any cache node is changed, the data content directory list is updated, and the updated data content directory list is distributed to each cache node in the cache node group.

The determined adjustment information for the absolute difference in the data processing method provided in the embodiment of the present invention further includes adjustment proportion information.

The adjustment proportion information includes a proportion adjustment instruction for controlling adjustment of proportions of the collaborative replacement-allowable data storage space and the local replacement-allowable data storage space of the cache node.

Figure 24:
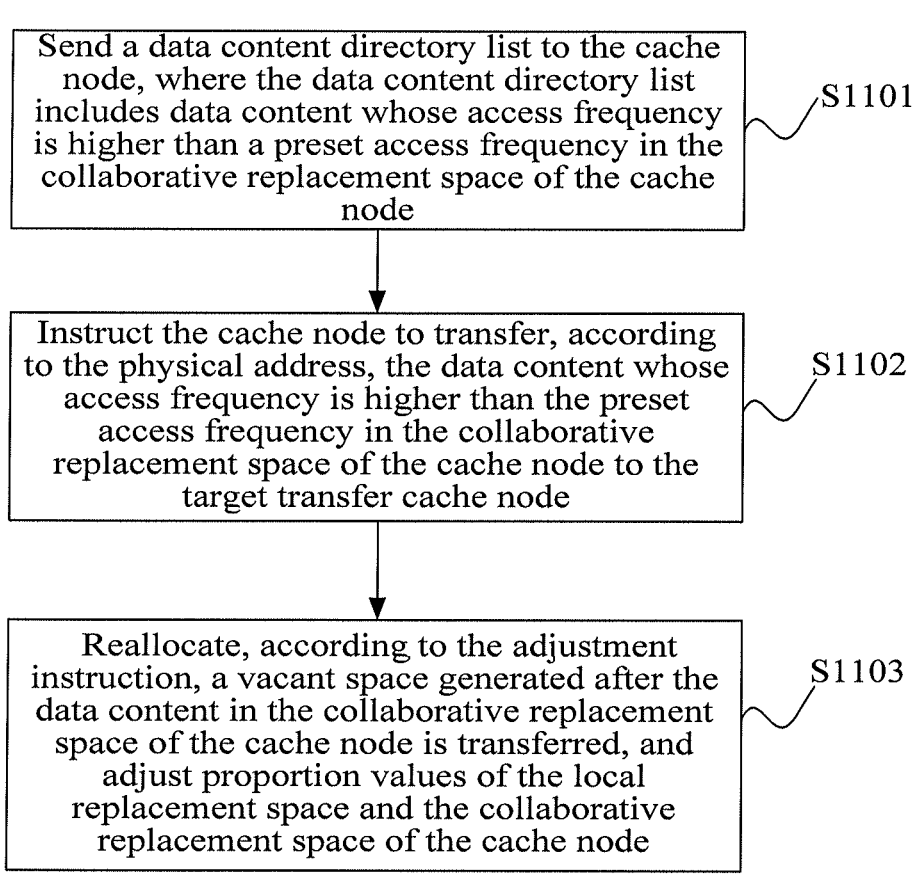
FIG. 24 is a detailed flowchart of controlling transfer of data content in a collaborative replacement-allowable data storage space of a cache node according to an embodiment of the present invention.

After the cache node transfers the data content in the collaborative replacement-allowable data storage space according to the transfer instruction, the vacant storage space needs to be readjusted and reallocated. Therefore, after the content in the collaborative replacement-allowable data storage space of the cache node is transferred, the following step is further included, as shown in FIG. 24:

Step S1103: Reallocate, according to the adjustment instruction, a vacant space generated after the data content in the collaborative replacement-allowable data storage space of the cache node is transferred, and adjust proportion values of the local replacement-allowable data storage space and the collaborative replacement-allowable data storage space of the cache node.

Figure 25:
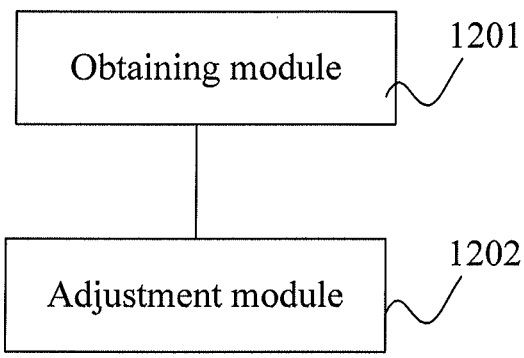
FIG. 25 is a first schematic structural diagram of a collaboration controller according to an embodiment of the present invention.

The embodiment of the data processing method applied at the collaboration controller side is described above. For the embodiment of the method, an embodiment of the present invention provides a collaboration controller. FIG. 25 shows a schematic structural diagram of the collaboration controller, including:

an obtaining module 1201, configured to obtain a link utilization ratio of a topological link on which each cache node in a cache node group is located; and an adjustment module 1202, configured to adjust, according to the link utilization ratio obtained by the obtaining module, a proportion of each cache node participating in collaboration in the cache node group.

The collaboration controller provided in the embodiment of the present invention is responsible for collaborative caching of data content, collecting various information used for collaborative control, receiving and processing various collaboration request information sent by a cache node, and sending various collaboration commands to the cache node.

Figure 26:
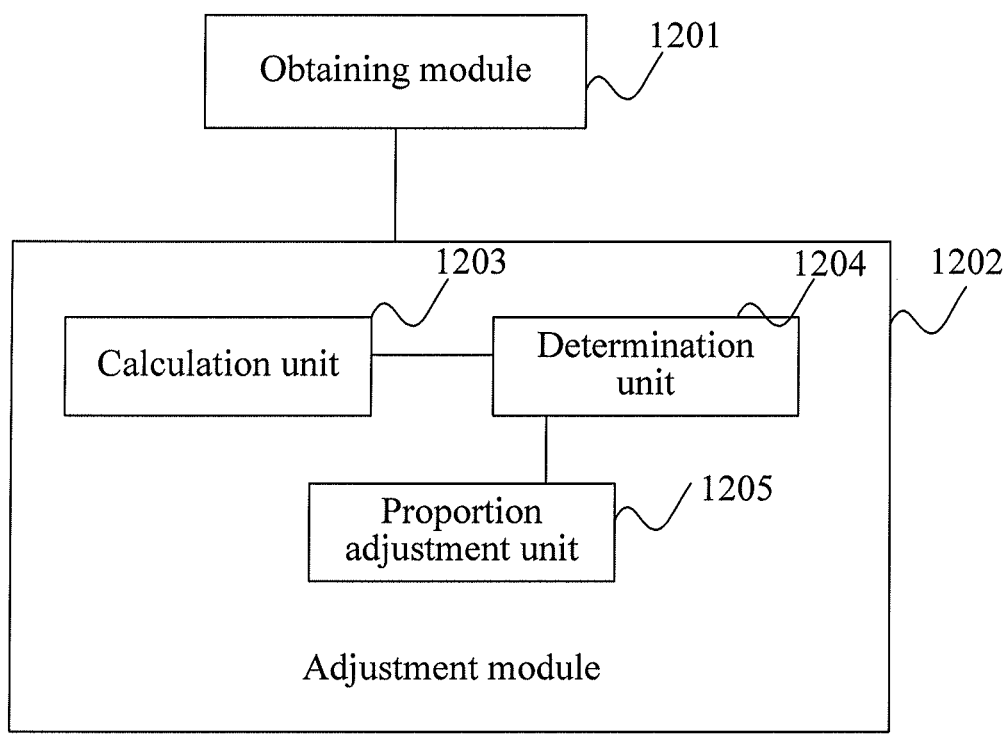
FIG. 26 is a second schematic structural diagram of a collaboration controller according to an embodiment of the present invention.
Figure 27:
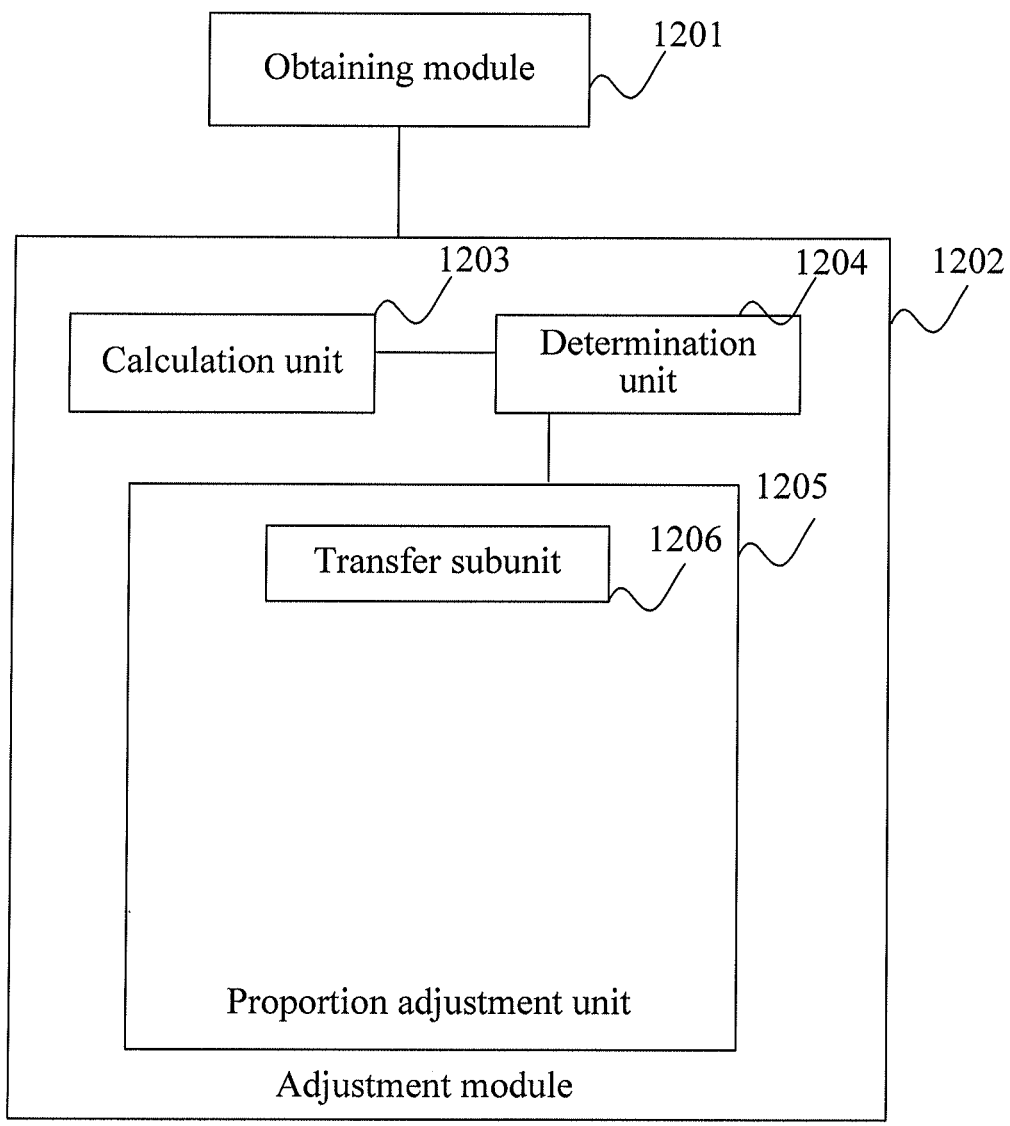
FIG. 27 is a third schematic structural diagram of a collaboration controller according to an embodiment of the present invention.

Based on the collaboration controller shown in FIG. 25, FIG. 26 shows a detailed schematic structural diagram of the adjustment module 1202 of the collaboration controller provided in the embodiment of the present invention, including:

a calculation unit 1203, configured to calculate an average link utilization ratio of each cache node in the cache node group and an absolute difference between a current link utilization ratio of each cache node and the average link utilization ratio;

a determination unit 1204, configured to determine, by using a preset basic adjustment granularity for participation in collaboration as a reference value, adjustment information for the absolute difference obtained by the calculation unit 1203; and a proportion adjustment unit 1205, configured to send the adjustment information determined by the determination unit 1204 to a cache node corresponding to the adjustment information, and control the cache node to adjust, according to the adjustment information, the proportion of the cache node participating in collaboration.

Figure 28:
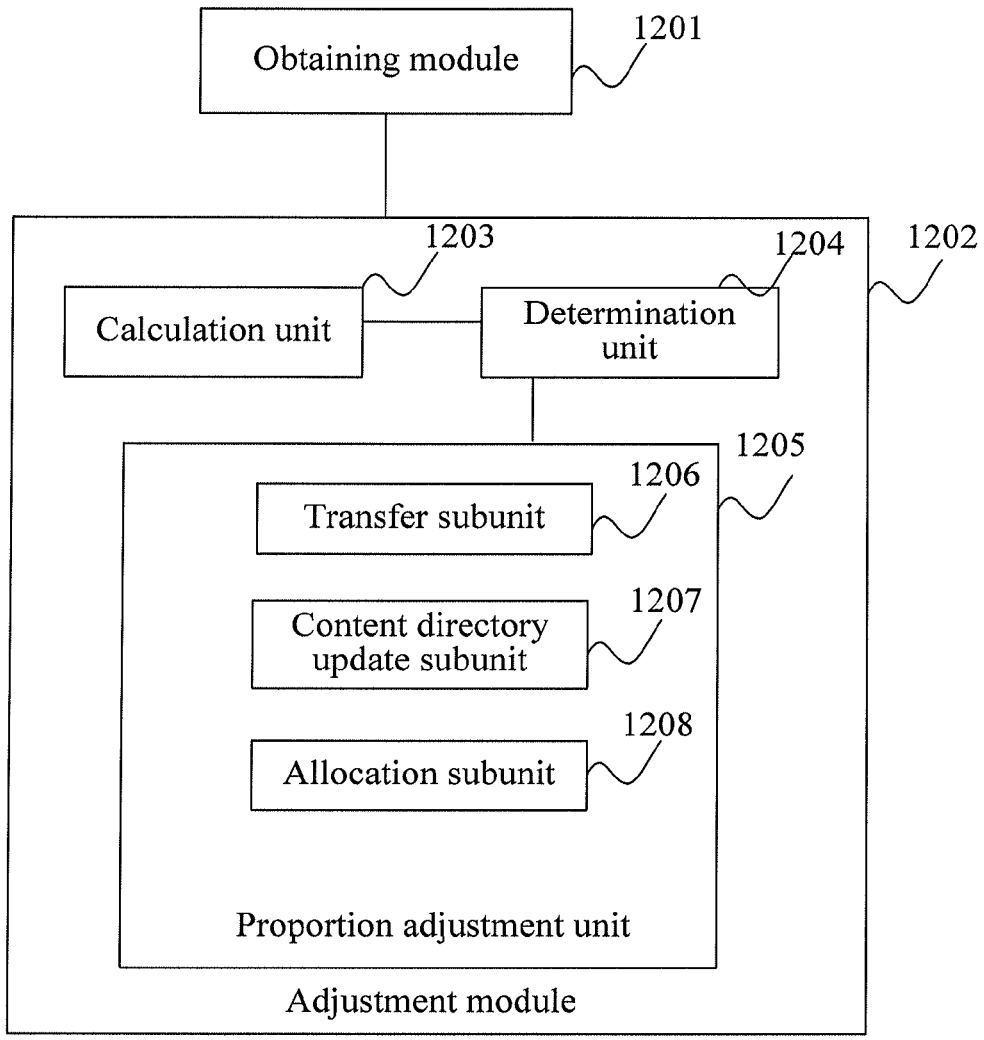
FIG. 28 is a fourth schematic structural diagram of a collaboration controller according to an embodiment of the present invention.

In the collaboration controller provided in the embodiment of the present invention, as shown in FIG. 28, the proportion adjustment unit 1205 in the adjustment module 1202 includes:

a transfer subunit 1206, configured to control, according to the adjustment information determined by the determination unit 1204, transfer of data content in a collaborative replacement-allowable data storage space of the cache node;

a content directory update subunit 1207, configured to statistically summarize a data content directory list uploaded by each cache node and send the summarized data content directory list to each cache node; and an allocation subunit 1208, configured to reallocate, according to the adjustment information determined by the determination unit 1204, a vacant space generated after the data content in the collaborative replacement-allowable data storage space of the cache node is transferred, and adjust proportions of a local replacement-allowable data storage space and the collaborative replacement-allowable data storage space of the cache node.

Figure 29:
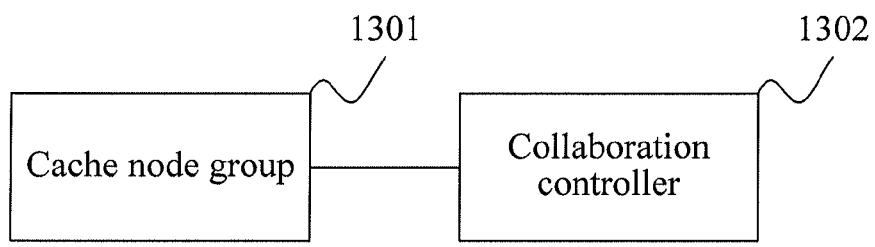
FIG. 29 is a schematic structural diagram of a data processing system according to an embodiment of the present invention.

The basic structure of the collaboration controller provided in the embodiment of the present invention is described above. In combination with the cache node and the collaboration controller provided in the embodiments of the present invention, an embodiment of the present invention further provides a data processing system. FIG. 29 shows a schematic structural diagram of the data processing system, including:

a cache node group 1301 formed by cache nodes and a collaboration controller 1302.

The cache node in the cache node group 1301 includes a control module, a local replacement-allowable data storage space, and a collaborative replacement-allowable data storage space;

where:

the local replacement-allowable data storage space is used for storing data accessed by a local client;

the collaborative replacement-allowable data storage space is used for storing data content accessed by a non-local client; and the control module is configured to receive a data request sent by a client, and search, in the local replacement-allowable data storage space, for data content corresponding to the data request; when the data content is not found in the local replacement-allowable data storage space, query a mapping relationship between data content and corresponding cache nodes that store the data content, where the mapping relationship is set in a data content directory list, and according to the mapping relationship, use a cache node containing the data content among one or more other cache nodes in the cache node group as a target cache node; and obtain the data content from a collaborative replacement-allowable data storage space of the target cache node, and store the data content to the local replacement-allowable data storage space.

The collaboration controller includes: an obtaining module, configured to obtain a link utilization ratio of a topological link on which each cache node in the cache node group is located; and an adjustment module, configured to adjust, according to the link utilization ratio obtained by the obtaining module, a proportion of each cache node participating in collaboration in the cache node group.

To sum up, the data processing method, the cache node, the collaboration controller, and the system provided in the embodiments of the present invention may be applied in a distributed environment, where the storage space of the cache node is divided into two parts, namely the local replacement-allowable data storage space and the collaborative replacement-allowable data storage space. A local cache node receives a control message sent by the collaboration controller, and adjusts, according to the control information, the proportions of the storage space managed by the local replacement unit and the storage space managed by the collaborative replacement unit. The received control information includes an adjustment direction and an adjustment proportion value.

When new content received by the local cache node comes from a content source server which is not located in the collaboration region, the content is stored in the collaborative replacement space, where the content in the collaborative replacement-allowable data storage space is replaced according to access of a non-local user. When the received new content comes from the collaboration region, the content is stored in the local replacement-allowable data storage space, where the content in the local replacement-allowable data storage space is replaced according to access of a local user.

The local cache node sends the content list of the collaborative replacement-allowable data storage space to the collaboration controller, and receives content lists of the collaborative replacement-allowable data storage space of another local cache device from the collaboration controller. When the load of the local cache node is higher than a threshold, the hottest one or more pieces of content is selected from the collaborative replacement-allowable data storage space and transferred to the collaborative replacement-allowable data storage space of another local cache device with a low load.

By using the data processing method, the cache node, the collaboration controller, and the system provided in the embodiments of the present invention, for the replacement algorithm, the local replacement optimization is considered based on the global replacement optimization, thereby serving the local users in priority.

The collaboration controller only maintains content information of the collaborative space, and does not maintain content information of the local replacement-allowable data storage space, thereby significantly reducing the overhead of maintaining the number of copies of content.

A node with a heavy load proactively transfers hot content in its collaborative space to a node with a light load, which can achieve the effect of load balancing through adjustment.

The embodiments of the specification are described in a progressive manner, reference may be made between the same and similar parts of the embodiments, and what is emphasized in the description of each embodiment focuses on the difference from other embodiments. The foregoing descriptions are merely specific implementation manners of the present invention. It should be noted that a person of ordinary skill in the art can make various improvements and modifications without departing from the principle of the present invention. Such improvements and modifications should also be construed as falling within the protection scope of the present invention.

What is claimed is:

1. A data processing method based on a cache node group for data caching, wherein each cache node in the group comprises a local replacement-allowable data storage space for storing data accessed by a local client and a collaborative replacement-allowable data storage space for storing data content accessed by a non-local client;
   the method comprising:
   searching, by an accessed cache node receiving a data request from a client, for data content corresponding to the data request;
   querying a preset data content directory list when the data content is not found in a local replacement-allowable data storage space of the accessed cache node, wherein a mapping relationship between data content and corresponding cache nodes that store the data content is preset in the data content directory list;
   according to the mapping relationship, determining a target cache node containing the data content among one or more other cache nodes in the cache node group; and
   obtaining the data content from a collaborative replacement-allowable data storage space of the target cache node, and storing the data content to the local replacement-allowable data storage space of the accessed cache node, wherein when a number of times that the collaborative replacement-allowable data storage space is accessed is too great so that a utilization ratio of the link in which the cache node is located exceeds a preset link utilization ratio, the process of accessing the collaborative replacement-allowable data storage space, further comprises a process of transferring the data content in the collaborative replacement-allowable data storage space, which is specifically:
   collecting statistics of N pieces of data content based on a descending order of access frequencies in the collaborative replacement-allowable data storage space of a currently accessed cache node, wherein the N pieces of data content are all data content whose access frequency values exceed a preset access frequency value;
   sendinq a content list of the N pieces of data content to the collaboration controller;
   receiving a transfer instruction from the collaboration controller, wherein the transfer instruction comprises a physical address of a target transfer cache node with a low link utilization ratio; and
   according to the physical address, transferring the N pieces of data content to the collaborative replacement-allowable data storage space of the target transfer cache node with the low link utilization ratio.

2. The method according to claim 1, wherein the process of querying the preset data content directory list is specifically querying the data content directory list preset by a collaboration controller.

3. The method according to claim 2, wherein the process of determining the target cache node according to the mapping relationship comprises:
   querying the mapping relationship between data content and corresponding cache nodes that store the data content, wherein the mapping relationship is set in the preset data content directory list; and
   when the cache node corresponding to the data content requested by the client is found, using the cache node as the target cache node.

4. The method according to claim 3, further comprising:
   when the cache node corresponding to the data content requested by the client is not found, forwarding, to a content source server, the data request received from the client;
   obtaining, from the content source server, the data content corresponding to the data request; and
   storing the obtained data content to a collaborative replacement-allowable data storage space of the accessed cache node.

5. The method according to claim 4, further comprising:
   updating a directory list of data content stored in the collaborative replacement-allowable data storage space of the accessed cache node; and
   sending the updated directory list to the collaboration controller.

6. The method according to claim 5, wherein when a storage space of the collaborative replacement-allowable data storage space reaches a preset threshold, the process of storing the obtained data content to the collaborative replacement-allowable data storage space further comprises a process of replacing the data content in the collaborative replacement-allowable data storage space, which is:
   reading the data content directory list in the collaborative replacement-allowable data storage space, and querying data content that is least frequently accessed by the non-local client as recorded in the directory list; and
   replacing the data content that is least frequently accessed with the obtained data content.

7. The method according to claim 6, further comprising:
   reading the data content directory list in the local replacement-allowable data storage space, and querying the data content that is least frequently accessed by the local client as recorded in the directory list; and adding and saving the replaced data content that is least frequently accessed in the collaborative replacement-allowable data storage space to the local replacement-allowable data storage space, when access time of the replaced data content that is least frequently accessed in the collaborative replacement-allowable data storage space is later than access time of the data content that is least frequently accessed in the local replacement-allowable data storage space and a storage space of the local replacement-allowable data storage space does not reach a preset threshold;

replacing the data content that is least frequently accessed in the local replacement-allowable data storage space with the replaced data content that is least frequently accessed in the collaborative replacement-allowable data storage space, when access time of the replaced data content that is least frequently accessed in the collaborative replacement-allowable data storage space is later than access time of the data content that is least frequently accessed in the local replacement-allowable data storage space and a storage space of the local replacement-allowable data storage space reaches a preset threshold.

8. The method according to claim 3, wherein the process of obtaining the data content from the target cache node comprises:

forwarding, to the target cache node, the data request received by the accessed cache node from the client; and receiving the data content that is corresponding to the data request and is returned by the target cache node and stored in the collaborative replacement-allowable data storage space of the target cache node.

9. The method according to claim 8, wherein when a storage space of the local replacement-allowable data storage space reaches a preset threshold, the process of storing the obtained data content in the collaborative replacement-allowable data storage space of the target cache node to the local replacement-allowable data storage space of the accessed cache node further comprises a process of replacing the data content in the local replacement-allowable data storage space, which is:

reading the data content directory list in the local replacement-allowable data storage space, and querying data content that is least frequently accessed by the local client as recorded in the directory list; and replacing the data content that is least frequently accessed by the local client with the data content obtained from the collaborative replacement-allowable data storage space of the target cache node.

10. The method according to claim 9, further comprising:
reading a data content directory list in the collaborative replacement-allowable data storage space; and when the data content directory list does not record the replaced data content in the local replacement-allowable data storage space and a storage space of the collaborative replacement-allowable data storage space does not reach a preset threshold, adding and saving the replaced content that is least frequently accessed in the local replacement-allowable data storage space to the collaborative replacement-allowable data storage space.

11. The method according to claim 9, further comprising:
reading a data content directory list in the collaborative replacement-allowable data storage space, and querying the data content that is least frequently accessed by the non-local client as recorded in the directory list; and when the data content directory list does not record the replaced data content in the local replacement-allowable data storage space and a storage space of the collaborative replacement-allowable data storage space reaches a preset threshold, replacing the data content that is least frequently accessed by the non-local client in the collaborative replacement-allowable data storage space with the replaced data content that is least frequently accessed by the local client in the local replacement-allowable data storage space, and deleting the replaced data content that is least frequently accessed by the non-local client in the collaborative replacement-allowable data storage space.

12. A cache node applied in a cache node group for data caching, comprising at least a processor executing program codes which are stored in a memory, a local replacement-allowable data storage space, and a collaborative replacement-allowable data storage space;

wherein:

the local replacement-allowable data storage space is used for storing data accessed by a local client;

the collaborative replacement-allowable data storage space is used for storing data content accessed by a non-local client; and the cache node is configured to receive a data request sent by a client, and search, in the local replacement-allowable data storage space, for data content corresponding to the data request; when the data content is not found in the local replacement-allowable data storage space, query a mapping relationship between data content and corresponding cache nodes that store the data content, wherein the mapping relationship is set in a data content directory list, and according to the mapping relationship, use a cache node containing the data content among one or more other cache nodes in the cache node group as a target cache node; and obtain the data content from a collaborative replacement-allowable data storage space of the target cache node, and store the data content to the local replacement-allowable data storage space, wherein when a number of times that the collaborative replacement-allowable data storage space is accessed is too great so that a utilization ratio of the link in which the cache node is located exceeds a preset link utilization ratio, the process of accessing the collaborative replacement-allowable data storage space, further comprises a process of transferring the data content in the collaborative replacement-allowable data storage space, which is specifically:

collecting statistics of N pieces of data content based on a descending order of access frequencies in the collaborative replacement-allowable data storage space of a currently accessed cache node, wherein the N pieces of data content are all data content whose access frequency values exceed a preset access frequency value;

sending a content list of the N pieces of data content to the collaboration controller;

receiving a transfer instruction from the collaboration controller, wherein the transfer instruction comprises a physical address of a target transfer cache node with a low link utilization ratio; and according to the physical address, transferring the N pieces of data content to the collaborative replacement-allowable data storage space of the target transfer cache node with the low link utilization ratio.

13. The cache node according to claim 12, wherein the cache node is configured to:

receive the data request sent by the client;

search, in the local replacement-allowable data storage space, for the data content corresponding to the data request according to the data request received by the receiving unit;

a query unit, configured to query the mapping relationship between data content and corresponding cache nodes that store the data content, wherein the mapping relationship is set in the data content directory list when the search unit does not find the data content in the local replacement-allowable data storage space;

determine, according to the mapping relationship, the cache node containing the data content among one or more other cache nodes in the cache node group as the target cache node, when the mapping relationship between data content and corresponding cache nodes that store the data content is found; and obtain the data content from the collaborative replacement-allowable data storage space of the target cache node, and store the data content to the local replacement-allowable data storage space.

14. The cache node according to claim 13, wherein the cache node is configured to:

when the mapping relationship between data content and corresponding cache nodes that store the data content is not found, forward the data request received by the receiving unit to a content source server, and control the obtaining unit to obtain, from the content source server, the data content corresponding to the data request; and save the obtained data content to the collaborative replacement-allowable data storage space of the cache node;

when the mapping relationship between data content and corresponding cache nodes that store the data content is found, forward the data request received by the receiving unit to the target cache node, and control the cache node to obtain, from the collaborative replacement-allowable data storage space of the target cache node, the data content corresponding to the data request; and save the obtained data content to the local replacement-allowable data storage space of the cache node.

15. The cache node according to claim 14, wherein the cache node is configured to:

update a directory list of data content stored in the local replacement-allowable data storage space or the collaborative replacement-allowable data storage space and send the updated directory list of the collaborative replacement-allowable data storage space to a collaboration controller, when content stored in the local replacement-allowable data storage space or the collaborative replacement-allowable data storage space is changed.

16. The cache node according to claim 15, wherein the cache node is configured to:

collect statistics of access frequencies of content stored in the local replacement-allowable data storage space and the collaborative replacement-allowable data storage space.

17. The cache node according to claim 16, wherein the cache node is configured to:

manage a process in which the non-local client accesses to the collaborative replacement-allowable data storage space, and in a process in which the obtaining unit stores the obtained data content to the collaborative replacement-allowable data storage space, replace the data content in the collaborative replacement-allowable data storage space when a storage space of the collaborative replacement-allowable data storage space reaches a preset threshold;

manage a process in which the local client accesses to the local replacement-allowable data storage space, and in a process in which the obtaining unit stores the obtained data content to the local replacement-allowable data storage space, replace the data content in the local replacement-allowable data storage space when a storage space of the local replacement-allowable data storage space reaches a preset threshold.

18. The cache node according to claim 17, wherein the cache node is configured to:

process the replaced data content in the local replacement-allowable data storage space or the collaborative replacement-allowable data storage space.

19. The cache node according to claim 17, wherein the cache node is configured to:

transfer the data content stored in the collaborative replacement-allowable data storage space, when a utilization ratio of a link on which the cache node is located exceeds a preset link utilization ratio.

20. A data processing method based on a cache node group for data caching;

the method comprising:

obtaining a link utilization ratio of a topological link on which each cache node in the cache node group is located, wherein each cache node in the group comprises a local replacement-allowable data storage space for storing data accessed by a local client and a collaborative replacement-allowable data storage space for storing data content accessed by a non-local client; and adjusting, according to the link utilization ratio, a proportion of each cache node participating in collaboration in the cache node group by adjusting data content in both the collaborative replacement-allowable data storage space and the local replacement-allowable data storage space of each cache node, wherein when a number of times that the collaborative replacement-allowable data storage space is accessed is too great so that the link utilization ratio in which the cache node is located exceeds a preset link utilization ratio, the process of accessing the collaborative replacement-allowable data storage space, further comprises a process of transferring the data content in the collaborative replacement-allowable data storage space, which is specifically:

collecting statistics of N pieces of data content based on a descending order of access frequencies in the collaborative replacement-allowable data storage space of a currently accessed cache node, wherein the N pieces of data content are all data content whose access frequency values exceed a preset access frequency value;

sending a content list of the N pieces of data content to the collaboration controller;

receiving a transfer instruction from the collaboration controller, wherein the transfer instruction comprises a physical address of a target transfer cache node with a low link utilization ratio; and according to the physical address, transferring the N pieces of data content to the collaborative replacement-allowable data storage space of the target transfer cache node with the low link utilization ratio.

21. The method according to claim 20, wherein the obtaining process of obtaining the link utilization ratio of each cache node in the cache node group is one of:

proactively collecting the utilization ratio of each cache node in the cache node group; or receiving the link utilization ratio uploaded by each cache node; or setting a third-party collection device, and collecting the link utilization ratio of each cache node through the third-party collection device.

22. The method according to claim 21, wherein the process of adjusting the collaboration proportion comprises:

calculating an average link utilization ratio of each cache node in the cache node group and an absolute difference between a current link utilization ratio of each cache node and the average link utilization ratio;

determining adjustment information for the absolute difference by using a preset basic adjustment granularity for participation in collaboration as a reference value; and sending the adjustment information to a cache node corresponding to the adjustment information, and controlling the cache node to adjust, according to the adjustment information, the proportion of the cache node participating in collaboration.

23. The method according to claim 22, wherein the determined adjustment information for the absolute difference comprises adjustment direction information;

the adjustment direction information comprises a transfer instruction for controlling transfer of the data content in the collaborative replacement-allowable data storage space of the cache node and a physical address of a target transfer cache node; and the process of controlling transfer of the data content in the collaborative replacement-allowable data storage space of the cache node according to the transfer instruction comprises:

sending a data content directory list to the cache node, wherein the data content directory list comprises data content whose access frequency is higher than a preset access frequency in the collaborative replacement-allowable data storage space of the cache node;

instructing the cache node to transfer, according to the physical address, the data content whose access frequency is higher than the preset access frequency in the collaborative replacement-allowable data storage space of the cache node to the target transfer cache node.

24. The method according to claim 23, further comprising:

receiving a data content directory list uploaded by each cache node, wherein the data content directory list contains a directory of data content stored in the collaborative replacement-allowable data storage space of each cache node, and access frequency information of the data content; and statistically summarizing the data content directory list uploaded by each cache node and sending the summarized data content directory list to each cache node.

25. The method according to claim 23, wherein the determined adjustment information for the absolute difference further comprises adjustment proportion information;

the adjustment proportion information comprises a proportion adjustment instruction for controlling adjustment of proportions of the collaborative replacement-allowable data storage space and the local replacement-allowable data storage space of the cache node; and after the content in the collaborative replacement-allowable data storage space of the cache node is transferred, the method further comprises:

reallocating, according to the adjustment instruction, a vacant space generated after the data content in the collaborative replacement-allowable data storage space of the cache node is transferred, and adjusting proportion values of the local replacement-allowable data storage space and the collaborative replacement-allowable data storage space of the cache node.

26. A collaboration controller, comprising at least a processor, executing program codes stored in a memory, which configure the collaboration controller to:

obtain a link utilization ratio of a topological link on which each cache node in a cache node group is located, wherein each cache node in the group comprises a local replacement-allowable data storage space for storing data accessed by a local client and a collaborative replacement-allowable data storage space for storing data content accessed by a non-local client; and adjust, according to the link utilization ratio obtained by the obtaining module, a proportion of each cache node participating in collaboration in the cache node group by adjusting data content in both the collaborative replacement-allowable data storage space and the local replacement-allowable data storage space of each cache node, wherein when a number of times that the collaborative replacement-allowable data storage space is accessed is too great so that the link utilization ratio in which the cache node is located exceeds a preset link utilization ratio, the process of accessing the collaborative replacement-allowable data storage space, further comprises a process of transferring the data content in the collaborative replacement-allowable data storage space, which is specifically:

collecting statistics of N pieces of data content based on a descending order of access frequencies in the collaborative replacement-allowable data storage space of a currently accessed cache node, wherein the N pieces of data content are all data content whose access frequency values exceed a preset access frequency value;

sending a content list of the N pieces of data content to the collaboration controller;

receiving a transfer instruction from the collaboration controller, wherein the transfer instruction comprises a physical address of a target transfer cache node with a low link utilization ratio; and according to the physical address, transferring the N pieces of data content to the collaborative replacement-allowable data storage space of the target transfer cache node with the low link utilization ratio.

27. The collaboration controller according to claim 26, further configured to:

calculate an average link utilization ratio of each cache node in the cache node group and an absolute difference between a current link utilization ratio of each cache node and the average link utilization ratio;

determine, by using a preset basic adjustment granularity for participation in collaboration as a reference value, adjustment information for the absolute difference; and send the adjustment information to a cache node corresponding to the adjustment information, and control the cache node to adjust, according to the adjustment information, the proportion of the cache node participating in collaboration.

28. The collaboration controller according to claim 27, further configured to:

control, according to the adjustment information, transfer of data content in a collaborative replacement-allowable data storage space of the cache node.

29. The collaboration controller according to claim 28, further configured to:

statistically summarize a data content directory list uploaded by each cache node and send the summarized data content directory list to each cache node.

30. The collaboration controller according to claim 28, further configured to:

reallocate, according to the adjustment information, a vacant space generated after the data content in the collaborative replacement-allowable data storage space of the cache node is transferred, and adjust proportions of a local replacement-allowable data storage space and the collaborative replacement-allowable data storage space of the cache node.

* * * * *